(12) United States Patent
Lechuga et al.

(10) Patent No.: US 10,422,134 B2
(45) Date of Patent: *Sep. 24, 2019

(54) WALL MOUNTED RECEIVER

(71) Applicants: Gabriel V. Lechuga, Rancho Mirage, CA (US); Alex Lechuga, Rancho Mirage, CA (US)

(72) Inventors: Gabriel V. Lechuga, Rancho Mirage, CA (US); Alex Lechuga, Rancho Mirage, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/215,631

(22) Filed: Dec. 10, 2018

(65) Prior Publication Data

US 2019/0106884 A1    Apr. 11, 2019

Related U.S. Application Data

(63) Continuation of application No. 15/595,937, filed on May 15, 2017, now Pat. No. 10,151,112, which is a
(Continued)

(51) Int. Cl.
*E04C 2/52* (2006.01)
*F16L 5/10* (2006.01)
(Continued)

(52) U.S. Cl.
CPC ............... *E04C 2/52* (2013.01); *F16L 5/02* (2013.01); *F16L 5/10* (2013.01); *F16L 13/141* (2013.01);
(Continued)

(58) Field of Classification Search
CPC . F16L 13/141; F16L 59/18; F24F 7/02; E04D 13/174; E04D 13/17; E04D 13/1476; E04D 13/1475; H02G 3/185; E04B 5/48
(Continued)

(56) References Cited

U.S. PATENT DOCUMENTS

| 737,437 A | * | 8/1903 | Meyer | E04D 13/0409 |
| | | | | 126/318 |
| 1,112,525 A | * | 10/1914 | Darling | F16M 11/04 |
| | | | | 248/187.1 |

(Continued)

*Primary Examiner* — Rodney Mintz
(74) *Attorney, Agent, or Firm* — Law Office of David Hong

(57) ABSTRACT

This invention presents a wall mounted receiver to accommodate insulated or non-insulated pipes and at least one inlet or portal for at least one pipe conduit or wiring per portal and with a high degree of flexibility and unique mechanical connection security; this receiver is arranged to receive the piping from any directional angle with a unique flexible inlet capability; without limitation, this receiver is for use with refrigeration or air conditioning equipment and related connections, such as insulated pipes, non-insulated pipes, condensation piping, conduit and wiring. The receiver can be mounted to different wall surface types without the assistance of a wall bracket; can also be fit into tight space service areas depending on refrigeration equipment requirements; can be installed in new construction applications; and can also upgrade existing installations without the need to cut the existing piping.

13 Claims, 27 Drawing Sheets

Related U.S. Application Data continuation of application No. 15/221,585, filed on Jul. 27, 2016, now Pat. No. 9,651,174, which is a continuation-in-part of application No. 14/810,378, filed on Jul. 27, 2015, now Pat. No. 9,523,200, which is a continuation of application No. 12/929,832, filed on Feb. 18, 2011, now Pat. No. 9,091,377.

(60) Provisional application No. 61/306,030, filed on Feb. 19, 2010.

(51) Int. Cl.
| | |
|---|---|
| *F16L 59/18* | (2006.01) |
| *F16L 21/06* | (2006.01) |
| *F16L 13/14* | (2006.01) |
| *F16L 21/03* | (2006.01) |
| *F16L 5/02* | (2006.01) |
| *F16L 21/08* | (2006.01) |
| *E04D 13/147* | (2006.01) |

(52) U.S. Cl.
CPC .............. *F16L 21/03* (2013.01); *F16L 21/065* (2013.01); *F16L 21/08* (2013.01); *F16L 59/18* (2013.01); *F16L 59/182* (2013.01); *E04D 13/1475* (2013.01); *E04D 13/1476* (2013.01)

(58) Field of Classification Search
USPC ........ 52/198, 199, 219, 220.1, 220.3, 220.5, 52/220.8
See application file for complete search history.

(56) References Cited

U.S. PATENT DOCUMENTS

| | | | | |
|---|---|---|---|---|
| 1,258,884 | A * | 3/1918 | Fife ................. | E04D 13/1476 285/12 |
| 1,587,250 | A * | 6/1926 | Stephenson ......... | E04D 13/1476 285/44 |
| 2,234,640 | A * | 3/1941 | Austin, Jr. .......... | H02G 3/22 174/668 |
| 2,307,080 | A * | 1/1943 | Schaefer ............ | B60R 13/02 29/525 |
| 2,319,410 | A * | 5/1943 | Leary ................. | E04F 19/08 220/3.2 |
| 3,313,559 | A * | 4/1967 | Kifer .................. | E04D 13/1476 285/136.1 |
| 3,425,456 | A * | 2/1969 | Schibig .............. | F16L 59/024 137/375 |
| 3,704,507 | A * | 12/1972 | Grube ................. | B21D 53/24 206/343 |
| 3,722,565 | A * | 3/1973 | Miller, Jr. ........... | A47B 91/024 248/188.4 |
| 4,071,267 | A * | 1/1978 | Davis ................. | F16L 3/00 285/136.1 |
| 4,075,803 | A * | 2/1978 | Alesi, Jr. ............ | E02D 29/12 52/220.8 |
| 4,170,430 | A * | 10/1979 | Mrotzek ............. | E04B 1/6158 403/20 |
| 4,442,643 | A * | 4/1984 | Stadheim ............ | E04F 17/04 285/44 |
| 4,553,000 | A * | 11/1985 | Appleton ............ | H01R 13/629 200/50.29 |
| 4,625,469 | A * | 12/1986 | Gentry ............... | E04D 3/3601 52/3 |
| 4,860,513 | A * | 8/1989 | Whitman ............ | E04D 3/3603 52/410 |
| 4,864,782 | A * | 9/1989 | Hasty ................. | E04D 13/1471 52/60 |
| 4,928,349 | A * | 5/1990 | Oikawa .............. | F16L 5/02 16/2.1 |
| 4,964,594 | A * | 10/1990 | Webb ................. | B64C 1/12 244/129.3 |
| 5,055,334 | A * | 10/1991 | Lechuga ............. | F16L 59/168 137/375 |
| 5,221,814 | A * | 6/1993 | Colbaugh ........... | H02G 3/14 174/58 |
| 5,244,326 | A * | 9/1993 | Henriksen .......... | F16B 37/145 411/180 |
| 5,298,701 | A * | 3/1994 | Sandor ............... | H01R 13/707 200/50.31 |
| 5,303,730 | A * | 4/1994 | Trueb ................. | F16L 9/22 137/375 |
| 5,328,212 | A * | 7/1994 | Kosik, Jr. ........... | E04D 13/1475 285/208 |
| 5,360,031 | A * | 11/1994 | Trueb ................. | F16L 59/11 137/375 |
| RE34,832 | E * | 1/1995 | Lechuga ............. | F16L 59/168 137/375 |
| D354,738 | S * | 1/1995 | Zimmermann ...... | D13/158 |
| 5,391,028 | A * | 2/1995 | Charles .............. | F16B 37/145 244/1 A |
| 5,419,364 | A * | 5/1995 | Trueb ................. | F16L 9/22 137/375 |
| 5,427,417 | A * | 6/1995 | Lechuga ............. | E03C 1/12 210/153 |
| 5,472,241 | A * | 12/1995 | Kosik, Jr. ........... | E04D 13/1475 283/42 |
| 5,486,650 | A * | 1/1996 | Yetter ................. | H02G 3/10 174/53 |
| 5,503,193 | A * | 4/1996 | Nygaard ............. | F16L 59/02 137/375 |
| 5,524,669 | A * | 6/1996 | Trueb ................. | F16L 9/22 137/375 |
| 5,526,619 | A * | 6/1996 | Vagedes ............. | E03B 9/00 248/56 |
| 5,540,255 | A * | 7/1996 | Trueb ................. | F16L 59/11 137/375 |
| 5,564,463 | A * | 10/1996 | Helmsderfer ....... | E03C 1/12 137/247.49 |
| 5,594,202 | A * | 1/1997 | Tobias ................ | H02G 3/22 174/505 |
| 5,628,484 | A * | 5/1997 | Lechuga ............. | E03C 1/326 248/149 |
| 5,678,598 | A * | 10/1997 | Helmsderfer ....... | E03C 1/12 137/247.51 |
| 5,722,699 | A * | 3/1998 | Brancher ............ | E03F 3/04 285/142.1 |
| 5,789,702 | A * | 8/1998 | Perella ............... | H02G 3/16 174/481 |
| 5,815,996 | A * | 10/1998 | Granger .............. | F24F 7/02 52/202 |
| 5,860,256 | A * | 1/1999 | Humber .............. | E04D 13/1476 285/42 |
| 5,880,420 | A * | 3/1999 | Rohmer .............. | H01R 13/707 200/50.28 |
| 5,901,739 | A * | 5/1999 | Helmsderfer ....... | F16L 59/168 137/247.49 |
| 5,907,938 | A * | 6/1999 | Sheahan ............. | E04D 3/3603 411/531 |
| 5,915,412 | A * | 6/1999 | Helmsderfer ....... | F16L 7/00 137/247.49 |
| 5,918,431 | A * | 7/1999 | Schiedegger ....... | E04C 1/392 248/56 |
| 5,941,535 | A * | 8/1999 | Richard .............. | E03F 5/02 277/604 |
| 5,970,667 | A * | 10/1999 | Thaler ................ | E04D 13/1407 285/42 |
| 6,012,763 | A * | 1/2000 | Clemente ........... | B60J 5/108 296/146.11 |
| D426,813 | S * | 6/2000 | Rohmer .............. | D13/169 |
| 6,180,882 | B1 * | 1/2001 | Dinh .................. | H02G 3/22 16/2.2 |
| 6,224,309 | B1 * | 5/2001 | Yamamoto ......... | F16B 19/1072 411/11 |
| 6,314,692 | B1 * | 11/2001 | Munzenberger .... | E04G 11/40 52/220.1 |
| 6,357,188 | B1 * | 3/2002 | Lee .................... | E02D 29/12 285/124.3 |

(56) References Cited

U.S. PATENT DOCUMENTS

| | | | |
|---|---|---|---|
| D457,140 S * | 5/2002 | Roesch | D13/152 |
| D459,312 S * | 6/2002 | Roesch | D13/152 |
| D462,664 S * | 9/2002 | Roesch | D13/152 |
| D463,376 S * | 9/2002 | Roesch | D13/152 |
| 6,448,515 B1 * | 9/2002 | Rohmer | H01H 9/104 |
| | | | 200/50.12 |
| 6,455,773 B2 * | 9/2002 | Bellanger | H02G 3/085 |
| | | | 174/50 |
| 6,601,351 B1 * | 8/2003 | Zerfoss | E04D 13/1407 |
| | | | 285/42 |
| 6,637,166 B2 * | 10/2003 | Kinsey | H01R 27/02 |
| | | | 174/67 |
| 6,723,921 B2 * | 4/2004 | Vagedes | H02G 3/123 |
| | | | 174/54 |
| 6,739,353 B2 * | 5/2004 | Lechuga | E03C 1/025 |
| | | | 137/375 |
| 6,870,101 B1 * | 3/2005 | Hull | H02G 3/126 |
| | | | 174/53 |
| 6,872,884 B2 * | 3/2005 | Roesch | H02G 3/105 |
| | | | 174/50 |
| 6,940,016 B1 * | 9/2005 | Cornett | H01F 27/06 |
| | | | 174/50 |
| 6,969,799 B2 * | 11/2005 | Snyder | F16L 5/10 |
| | | | 174/483 |
| 7,055,863 B1 * | 6/2006 | Commeville | E03C 1/042 |
| | | | 137/359 |
| 7,100,633 B2 * | 9/2006 | Lechuga | E03C 1/32 |
| | | | 137/375 |
| 7,305,801 B2 * | 12/2007 | Gilleran | F24F 1/0003 |
| | | | 174/480 |
| 7,374,131 B2 * | 5/2008 | Tiid | B64D 9/003 |
| | | | 244/118.5 |
| 7,389,616 B2 * | 6/2008 | Gilleran | E04F 13/0869 |
| | | | 52/219 |
| 7,464,507 B2 * | 12/2008 | Zierer | E04G 15/061 |
| | | | 52/220.8 |
| D597,960 S * | 8/2009 | Dinh | D13/152 |
| 7,770,335 B2 * | 8/2010 | Evensen | E04D 13/1407 |
| | | | 52/219 |
| D637,696 S * | 5/2011 | Ball | D23/259 |
| 7,954,286 B2 * | 6/2011 | Khan | E04D 13/1407 |
| | | | 156/71 |
| 8,057,144 B2 * | 11/2011 | Johnson | F16B 19/1072 |
| | | | 411/34 |
| D653,311 S * | 1/2012 | Lechuga | D23/266 |
| 8,151,821 B2 * | 4/2012 | Ball | E04G 15/061 |
| | | | 137/359 |
| 8,205,401 B2 * | 6/2012 | Ward | F24F 7/02 |
| | | | 454/367 |
| 8,267,630 B2 * | 9/2012 | Moon | F16B 5/02 |
| | | | 411/110 |
| 8,276,854 B2 * | 10/2012 | Mominee | F16L 5/00 |
| | | | 248/62 |
| 8,281,800 B2 * | 10/2012 | Ball | E03C 1/042 |
| | | | 137/359 |
| 8,307,592 B2 * | 11/2012 | Chang | F16L 5/14 |
| | | | 285/139.1 |
| 8,434,982 B2 * | 5/2013 | Henriksen, Jr. | F16B 37/145 |
| | | | 411/338 |
| 8,497,424 B2 * | 7/2013 | Castaldo | H02G 3/081 |
| | | | 174/50 |
| 8,672,597 B2 * | 3/2014 | Selle | F16B 37/062 |
| | | | 411/181 |
| 8,881,468 B2 * | 11/2014 | McMullen | E06B 1/62 |
| | | | 248/224.8 |
| 9,091,377 B2 * | 7/2015 | Lechuga | F16L 59/18 |
| 9,140,003 B1 * | 9/2015 | Gretz | E03B 9/025 |
| 9,169,648 B1 * | 10/2015 | Mills | E04D 13/1476 |
| 9,523,200 B2 * | 12/2016 | Lechuga | F16L 59/182 |
| 9,651,174 B2 * | 5/2017 | Lechuga | E04C 2/52 |
| 10,151,112 B2 * | 12/2018 | Lechuga | E04C 2/52 |
| 2002/0108316 A1 * | 8/2002 | Miller | E04D 13/1476 |
| | | | 52/60 |
| 2002/0108663 A1 * | 8/2002 | Lechuga | E03C 1/12 |
| | | | 138/158 |
| 2002/0112761 A1 * | 8/2002 | Lechuga | E03C 1/025 |
| | | | 137/375 |
| 2004/0016191 A1 * | 1/2004 | Whitty | F16L 5/04 |
| | | | 52/232 |
| 2004/0144045 A1 * | 7/2004 | Granger | E04D 13/17 |
| | | | 52/199 |
| 2004/0154662 A1 * | 8/2004 | Lechuga | E03C 1/32 |
| | | | 137/375 |
| 2004/0211467 A1 * | 10/2004 | Lechuga | F16L 59/022 |
| | | | 137/375 |
| 2005/0172569 A1 * | 8/2005 | Jutras | E04D 13/1407 |
| | | | 52/219 |
| 2006/0096195 A1 * | 5/2006 | Zierer | E04G 15/061 |
| | | | 52/220.1 |
| 2007/0138789 A1 * | 6/2007 | Muenzenberger | B23B 51/0426 |
| | | | 285/189 |
| 2007/0243037 A1 * | 10/2007 | Pratt | F16B 13/0858 |
| | | | 411/43 |
| 2010/0011685 A1 * | 1/2010 | Janoski | E04D 13/1407 |
| | | | 52/219 |
| 2010/0192490 A1 * | 8/2010 | Chang | F16L 5/14 |
| | | | 52/220.1 |
| 2010/0269943 A1 * | 10/2010 | Arai | E04F 17/04 |
| | | | 138/119 |
| 2011/0203201 A1 * | 8/2011 | Lechuga | F16L 59/18 |
| | | | 52/220.1 |
| 2012/0216469 A1 * | 8/2012 | Mescall | E03C 1/021 |
| | | | 52/220.1 |
| 2012/0255330 A1 * | 10/2012 | Wanweerakul | D06F 39/083 |
| | | | 68/208 |
| 2013/0078903 A1 * | 3/2013 | Mantyla | F24F 7/02 |
| | | | 454/367 |
| 2013/0205693 A1 * | 8/2013 | Scott | E04D 13/1476 |
| | | | 52/198 |
| 2013/0219821 A1 * | 8/2013 | Andresen | E04H 12/08 |
| | | | 52/651.01 |
| 2014/0259974 A1 * | 9/2014 | Gilleran | F16L 5/02 |
| | | | 52/62 |
| 2015/0047276 A1 * | 2/2015 | Gandolfo | F16L 5/04 |
| | | | 52/220.8 |
| 2016/0326745 A1 * | 11/2016 | Lechuga | F16L 59/182 |
| 2017/0030491 A1 * | 2/2017 | Lechuga | E04C 2/52 |
| 2018/0298610 A1 * | 10/2018 | Lechuga | E04C 2/52 |

* cited by examiner

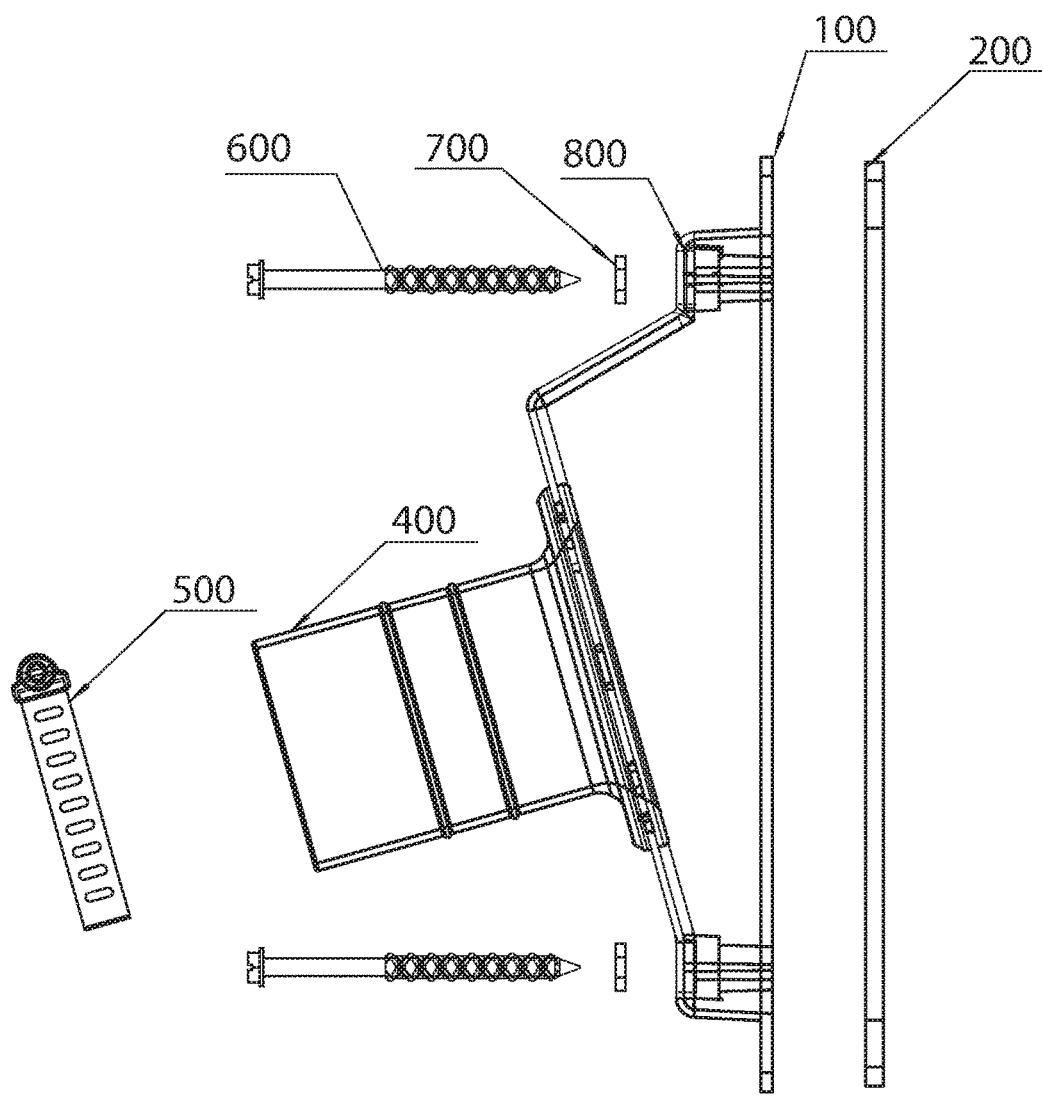

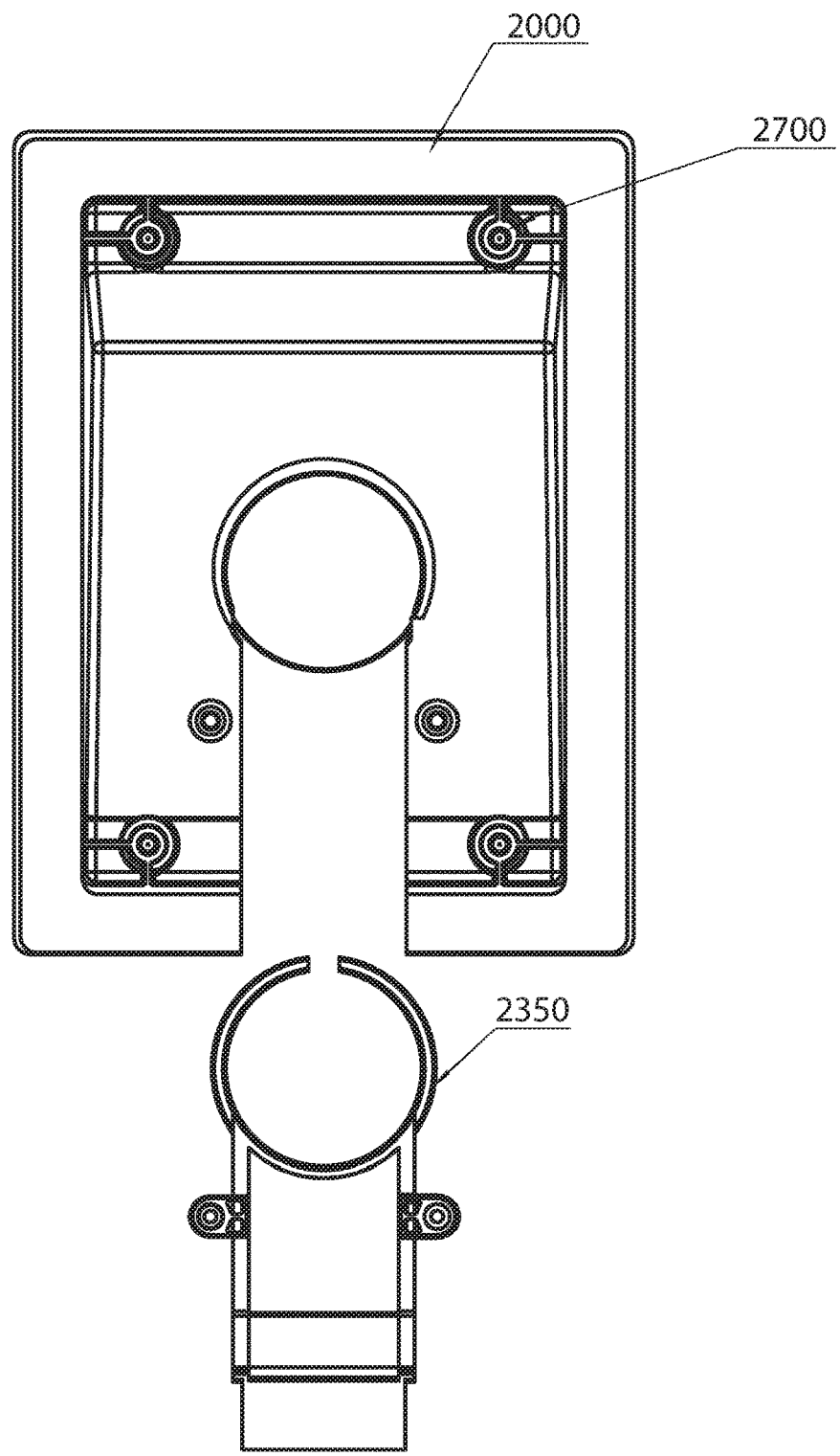

WALL MOUNTED RECEIVER

CROSS REFERENCE TO RELATED APPLICATIONS

This application is a continuation of U.S. patent application Ser. No. 15/595,937, filed on May 15, 2017 and issues as U.S. Pat. No. 10/151,112 on Dec. 11, 2018, which claims priority to PCT/US2016/044345, filed on Jul. 27, 2016 and U.S. patent application Ser. No. 15/221,585, filed on Jul. 27, 2016 and issues as U.S. Pat. No. 9,651,174 on May 16, 2017, which is a continuation in part of U.S. patent application Ser. No. 14/810,378, which was filed on Jul. 27, 2015 and issued as U.S. Pat. No. 9,523,200 on Dec. 20, 2016, which claims priority to U.S. patent application Ser. No. 12/929,832, which was filed on Feb. 18, 2011 and issued as U.S. Pat. No. 9,091,377 on Jul. 28, 2015 and claimed the benefit of U.S. Provisional Application No. 61/306,030, which was filed on Feb. 19, 2010; all referenced applications are incorporated by reference in entirety.

BACKGROUND

This invention relates in general to certain new and useful and required improvements in efficient and aesthetic methods to prevent conditioned air leakage, atmospheric air infiltration, moisture, rodents and insects.

The wall receiver seeks to help and improve current and future methods for improved long term optimal energy efficiencies in residential and commercial buildings and to follow the Residential and Commercial Energy Model Codes and the Residential and Commercial Building Model Codes.

In combination to the abovementioned, building fenestration has become an important energy efficient issue. The stoppage or minimization of outdoor atmospheric air coming into the building as well as the stoppage or minimization of indoor conditioned air leakage exiting the building, is a very important issue, as this negatively affects the controlled indoor building temperature and will make the cooling or heating mechanical systems work harder and longer and leads to more energy consumption.

There are also many associated performance installation challenges when wall penetration is required by refrigerant lines including, sealing, aesthetics, flexibility, isolation, vibration, degradation of the wall membrane and/or the refrigerant piping, or a combination of both. Many times, the multiple amounts of Air Conditioning or Heating Systems and their respective refrigerant piping are ganged up in one central location and make it difficult for the installer to install, seal, and protect from corrosion and/or degradation. Therefore, there is a need for a receiver that can accommodate refrigerant piping in a quick, efficient, aesthetic, single unit method and/or a systemic multiple battery gang method. These types of installations are common in single family dwellings, multi-family apartment type buildings, commercial buildings, office buildings, and where more than one unit system is installed in the same area.

There are many different ways that these installations are taking place, such as the recess boxing method; this is done by the installer having a metal box fabricated and embedded into the exterior wall and having the refrigerant piping going through it and then sealing all around with a urethane foam or other kind of sealant; however, this type of installation destroys any potential energy savings due to improper use of long term sealing, and aesthetically, the recess boxing method looks unsightly with unfinished cavities in the wall, and the hardened urethane foam materials fail and become cracked, which create air leakage gaps and further energy loss.

There are installations that are presently being used that make use of single inlet roof flashing, which get attached and are embedded into the rough membrane of the exterior wall and which are made of sheet metal, plastic or a combination. The flashing is used to contain an area for the refrigerant piping set to go through a single metal area and other flashing contain a neoprene resilient single area for the seal of the piping that stretches to accommodate different diameters.

However, there are several set-backs to these installation methods, which use metal-only flashing; not only does it become a necessity to seal for air leakage in the gap left between the piping and the annular metal area of the flashing, but this also creates is a very difficult hollow area to seal. These installations are presently being sealed with adhesive tape that fail in a very short time due to the constant vibration of these refrigerant pipes, and many times, there are left large voids; also, foam sealers, which are not intended for such use, tend to fail in a short period of time and leave large voids, which allows for vermin, rodents, air or moisture to enter the building. Roof flashing is also limited in that it does not allow the installer an option of attachment as the installation always has to be installed on the rough wall while construction is taking place; this can be a real problem if the installer misses or forgets to install during construction. The other limitation is that the single passageway holds a very thin area that requires a difficult angle to accommodate and lacks enough surface area continuance, which makes an efficient installation impossible; this is due to the combination of the flashings outer surface funnel shape and/or due to the lack of flexibility to receive piping from many times extreme and difficult directional angles to be received or accepted. In addition, whether a metal or plastic roof flashing is used or not used, the non-supported exterior wall flashing material, which gets terminated at the neck area radius of the flashing, creates a difficult and unsupported surface area to apply the seal materials. This all combines to create areas with unfinished material gaps, crevasses, and cracks that cause all of the above mentioned problems. The other limitation of roof flashings is the lack of flexibility that the single opening lacks as refrigerant piping address the wall from many different angles before going into or out of the exterior walls. See U.S. Pat. No. 5,288,267 Rodriguez and U.S. Pat. No. 7,730,681 Gilleran.

In addition, there is a final installation method that uses an exterior rigid plastic wall shield that is not always economically feasible. Most of the linear refrigerant piping is installed in the cavity of the exterior walls. Sealing to prevent air leakage and all the above mentioned issues are not a feature in that system. In addition there is a limitation with rigid shields as flexibility has become a challenge and an important requirement for full enclosure of these "hard to follow" piping patterns.

There is a need for a complete wall mounting receiver in the marketplace. The installer have been having to resort to "make shift" or custom fabrications or improper application type products that leave much room for improvement and are limited on sealing, aesthetics, attachment, vibration, isolation and are time consuming to the installer. Therefore, there is a need for a wall mounted receiver which is easy to install and highly efficient in operation.

OBJECTS OF THE INVENTION

One of the primary objects of the invention to provide a wall mounted receiver that will create a long term energy efficient refrigerant piping installation that will not depend on adhesives, tape, foam fillers, and will incorporate mechanical attachments for improved aesthetics and single and multiple inlets, connections, and sizes and any other combination thereof. It is another further object of the invention to mechanically connect a single insulated line set or a multiple refrigerant piping set or a battery refrigerant piping set to a single wall receiver that has the ability to seal and secure a single portal or multiple portals against air leakage and to accommodate different diameters and to include one or more portals within the same wall receiver.

Other objects of the present invention include: the wall receiver can be installed in an existing connected application without the need for cutting of the refrigerant piping; the wall mounted receiver portals have a high degree of flexibility that allows for sealing at an extreme angle and offer high flexibility to accommodate difficult to seal line set patterns; and the wall mounted receiver allow for an economic installation solution to allow the longest linear possible of the refrigerant piping to be installed without cutting and yet allow for the soft copper piping bending radius required, to exit at the equipment service point without the need for extra pipe, fittings, or joints to solder.

BRIEF SUMMARY OF THE INVENTION

The present invention relates to a wall mounted receiver that allows or receives refrigerant piping at the service point where the mechanical equipment is installed either outdoors or indoors. The building or wall receiver can be made out of plastic injected molded and made out of Acrylonitrile Styrene Acrylate (ASA) rigid Poly Vinyl Chloride (PVC) or Acrylic Butylene Styrene (ABS) or the like, and can either be fabricated or molded and made out of metal. These mentioned plastic materials can resist long term outdoor exposure by the use of additives. The portal or portals that are also mounted on the receiver and that will also be receiving the piping have a radius construction made out of plastic that is resilient flexible materials like Santoprene brand thermoplastic rubber, neoprene (polychloroprene synthetic rubbers), silicone or the like. The importance of this material to be flexible and resilient is that the specific point of connection is best suited with these features to accommodate different piping with different diameter sizes, so the requirement for resilient material is important multiple size fit capabilities. A tight and flexible supported fit can then be utilized to prevent building air leakage or the like from the portal, in addition a secondary holding fastener is also utilized to ensure a continued mechanical connection, security, and long term sealing with the refrigerant piping going through wall penetrations.

Fasteners are also part of the wall mounted receiver for wall attachment, and may come in different lengths depending on the wall membrane thickness requirement. The wall receiver can also include fastener openings or apertures that will allow easy installation directly to the wall. The use of caps can also be used to cover the fastener opening areas as well.

A wall mounted receiver to accommodate insulated pipes or non-insulated pipes of different sized diameters and can accommodate one or more inlets and or portals to accommodate single or multiple pipes conduit or wiring per portal, within the same receiver with a high degree of flexibility and unique mechanical connection security. The mounted wall receiver is arranged to receive the insulated piping or non-insulated piping from any directional angle with a unique flexible inlet capability. The wall receiver serves buildings with any kind of outdoor or indoor service refrigeration equipment piping. The wall receiver can also service air conditioning or refrigeration equipment and their respective service refrigerant lines, including without limitation: insulated pipes, non-insulated pipes, condensation piping, conduit and wiring.

The wall mounted receiver can be mounted to different wall surface materials and without the use of a wall bracket; the wall materials include without limitation: masonry, brick, siding, stucco and concrete. The wall mounted receiver can also be fit into tight space service areas depending on refrigeration equipment requirements. The wall mounted receiver is designed to be installed as an option for new construction applications, to upgrade existing installations without the need to cut the existing piping, to replace existing installations, and for addition to existing installations without the need to cut the existing piping, but all in an aesthetic and efficient way.

A receiver adapted for mounting on a building to receive a pipe, conduit or wiring, said receiver comprising: a receiver housing provided with a front panel; the receiver housing attached to an exterior of the building with threaded screws or bolts; the receiver housing having multiple apertures with integrated sockets for guiding the threaded screws or bolts; the receiver housing having a first receiver housing section and a second receiver housing section; the first and the second receiver housing sections being removably connected; the receiving housing having at least one inlet entry opening; the at least one inlet entry opening having an inlet port, which projects outwardly from the front panel; each said inlet port having an opening for receiving the pipe, conduit or wiring; each said inlet port has an inlet port flange for engaging the front panel of the receiver housing; and a port fastener, which clamps each said inlet port to the pipe, conduit or wiring. The first and the second receiver housing sections can be removably connected with a male connector piece and a female connector piece; each said inlet port has at least one inlet port guide, which are spaced apart to receive the port fastener; a gasket or a seal to engage the receiver housing against the exterior of the building; the receiver housing is attached to the exterior of the building with at least one of (a) anchoring fasteners or threaded rods and (b) the threaded screws or the bolts; and the port fastener is a clamp, ring or threaded securing fastener; an insulated pipe cover for insulation around the pipe, conduit or wiring.

A receiver adapted for mounting on a building to receive a pipe, conduit or wiring, said receiver comprising: a receiver housing provided with a front panel; the receiver housing attached to an exterior of the building with threaded screws or bolts; the receiver housing having multiple apertures with integrated sockets for guiding the threaded screws or bolts; the receiver housing having a first receiver housing section and a second receiver housing section; the first and the second receiver housing sections being removably connected together; at least one inlet entry opening through the front panel of the receiver housing; the at least one inlet entry opening having an inlet port, which projects outwardly from the front panel; each said inlet port having an opening for receiving the pipe, conduit or wiring; each said inlet port being flexible; each said inlet port has an inlet port flange for engaging the front panel of the receiver housing; and an elastomeric edge seal engages the receiver housing against the exterior of the building.

A receiver adapted for mounting on a building to receive a pipe, conduit or wiring, said receiver comprising: a receiver housing provided with a front panel; the receiver housing attached to an exterior of the building with threaded connectors; the receiver housing having multiple apertures with integrated sockets for guiding the threaded connectors; the receiver housing having a first receiver housing section and a second receiver housing section; the first and the second receiver housing sections being removably connected together with a male connector piece and a female connector piece; at least one inlet entry opening through the front panel of the receiver housing; the at least one inlet entry opening having an inlet port, which projects outwardly from the front panel; each said inlet port having an opening for receiving the pipe, conduit or wiring; each said inlet port being flexible; each said inlet port has an inlet port flange for engaging the front panel of the receiver housing.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIGS. 1A, 1B and 1C are a front perspective exploded view, a cross-sectional view and a rear view, respectively, of one preferred embodiment of the invention, which is a one-piece flanged wall receiver, including the installation hardware.

FIGS. 3A, 3B and 3C are a front perspective exploded view, a cross-sectional view and a rear view, respectively, of one preferred embodiment of the invention, which is a 2-piece section wall receiver, including the installation hardware.

PARTS LISTING

Figure 1A:
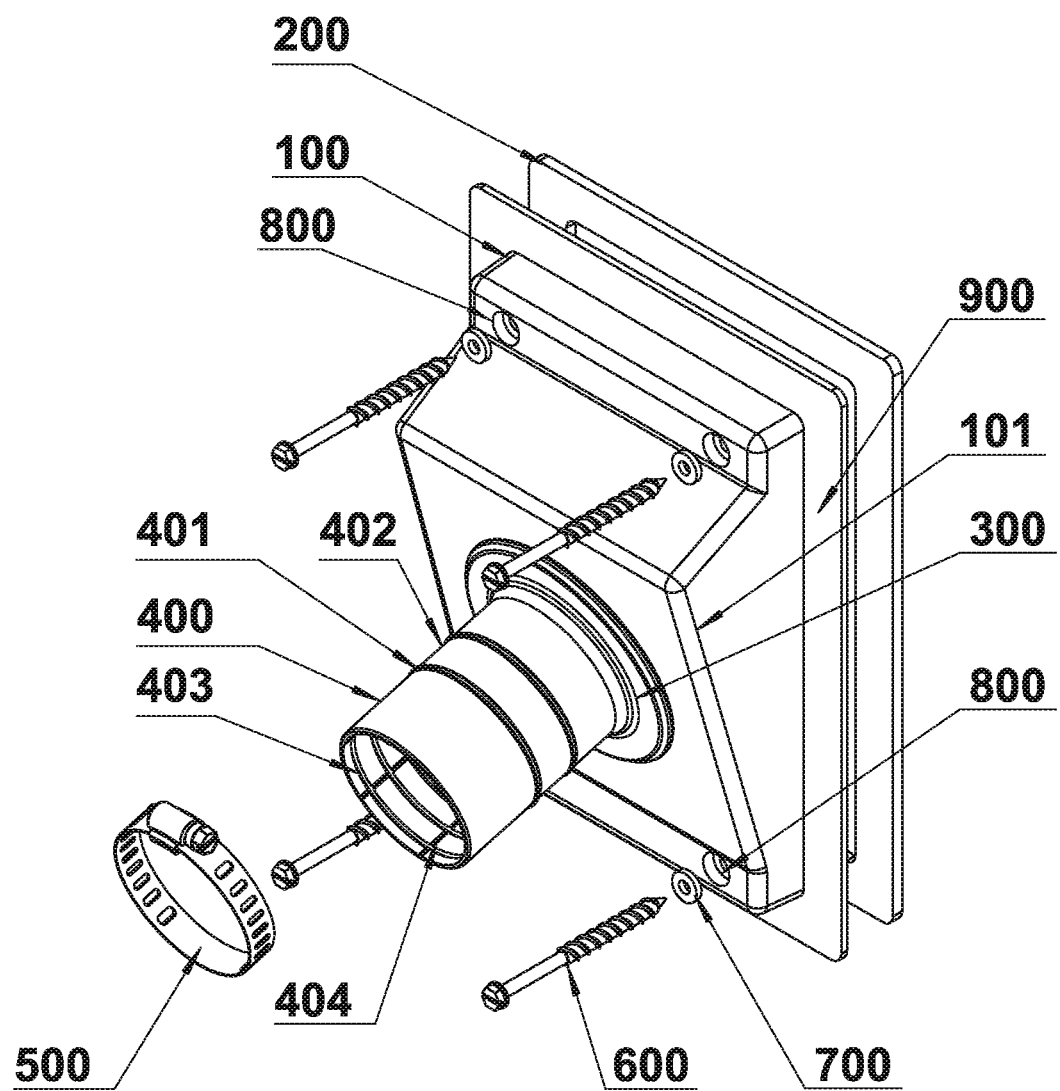
Figure 1C:
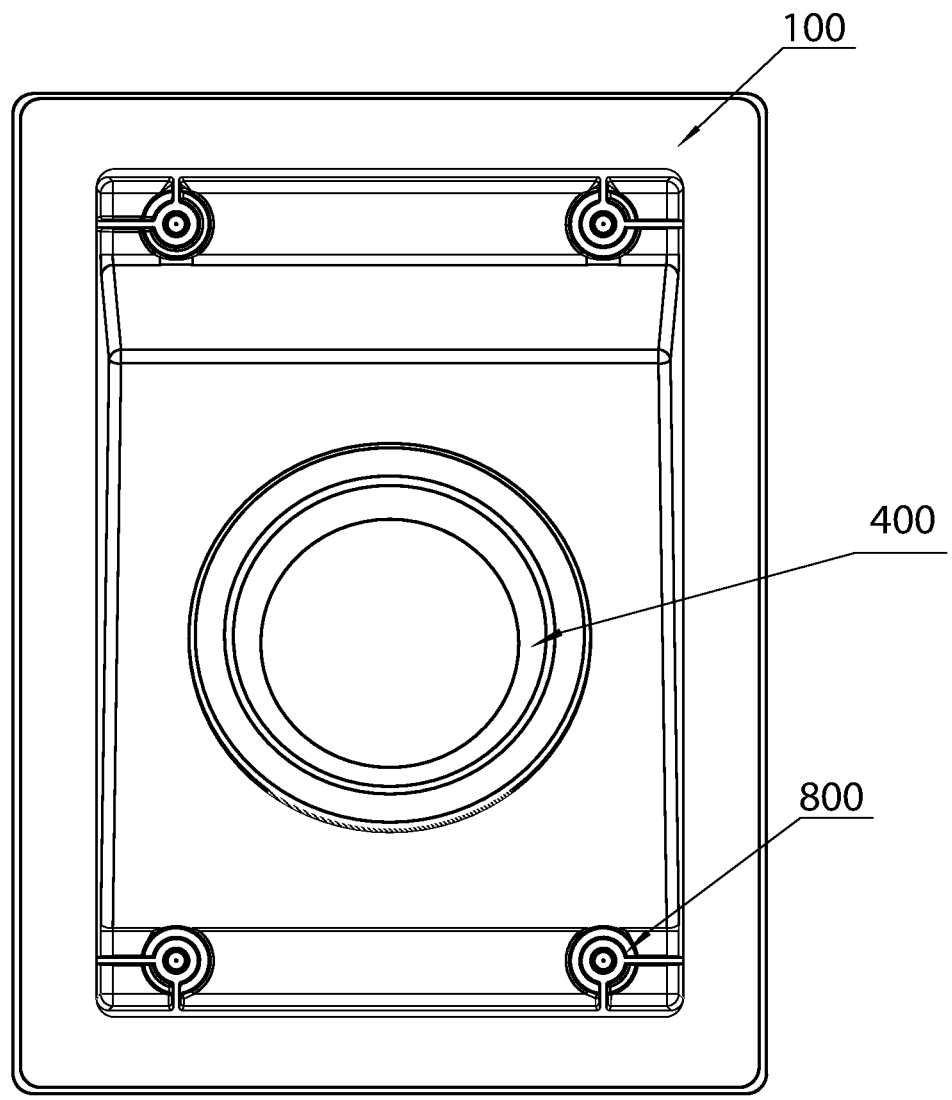
Figure 1D:
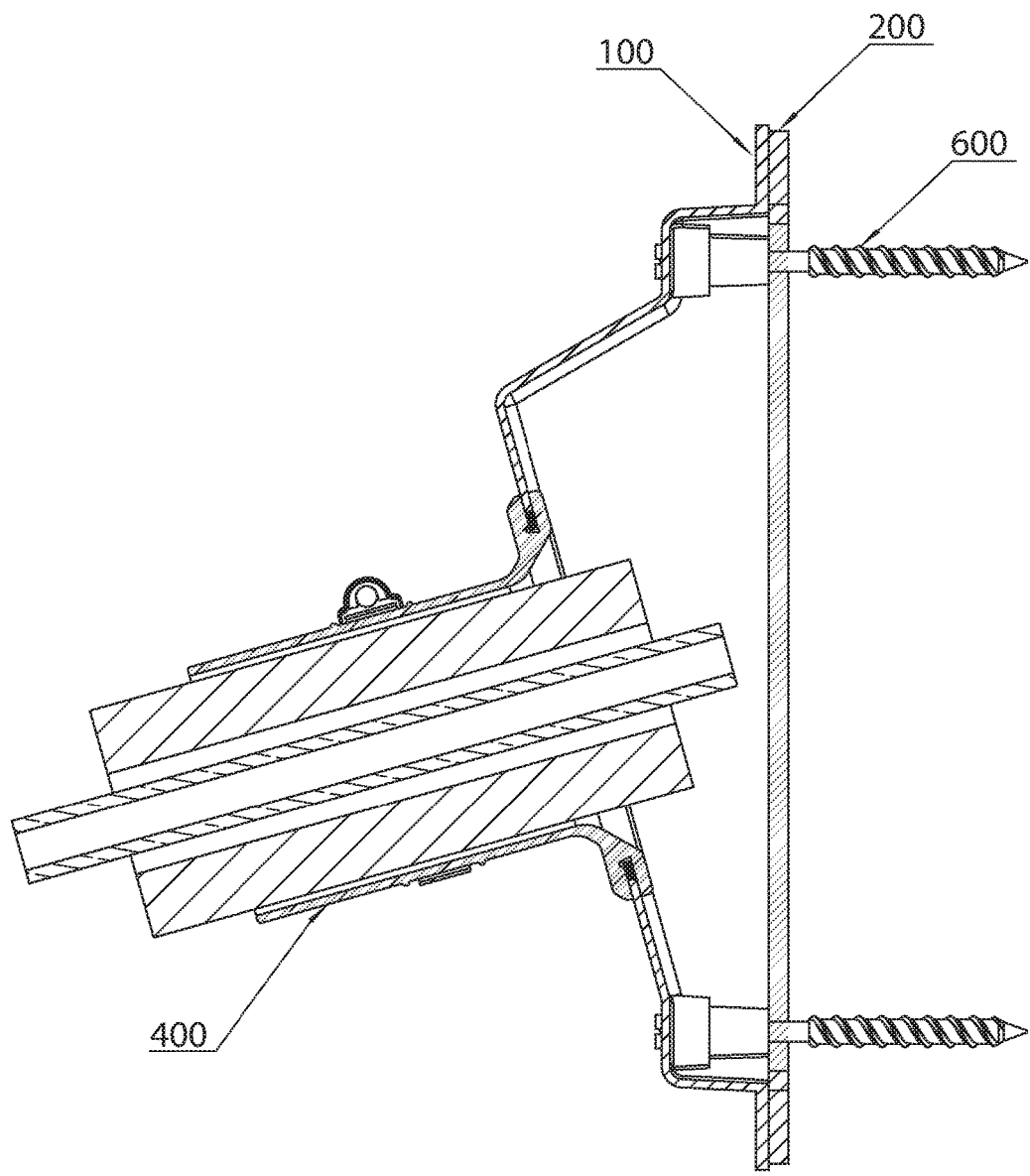
FIG. 1D shows a cross-sectional views of the embodiment in FIG. 1A with piping within the portal section.

100—Receiver
101—Receiver angle range design
200—receiver gasket
300—portal base or flange
400—portal
401—raised lines or guides
402—clamp designated area
403—cut off lines or weakened lines
404—ribs or standoffs
405—clamp type fastener
500—mechanical fastener; clamp
600—self-tapping screw or fastener
700—fastener washer seal
800—aperture for fastener
900—peripheral flange or rim (narrow edge perimeter)
1000—receiver
1200—receiver seal
1300—portal base or flange
1400—portal
1500—clamp type fastener
1600—self-tapping screw or fastener
1700—fastener washer seal
1800—aperture for fastener; aperture guides
1900—receiver perimeter (rear edge)
2000—first receiver section
2050—first receiver peripheral flange or rim (narrow edge perimeter)
2100—first receiver gasket
2200—first receiver portal base
2300—first receiver portal
2350—second receiver portal
2351—second receiver portal slit
2400—clamp fastener type
2500—first receiver self-tapping screw or fastener
2600—first receiver fastener washer seal
2700—first receiver aperture for fastener
2800—second receiver female threaded part (retainer housing)
2850—second receiver seal
2852—second receiver gasket
2860—second receiver bolt or screw type assembly fastener (attaches sec. part 1 & 2)
2861—first receiver fastener washer seal
2880—first receiver aperture for fastener
2900—second receiver section
3000—first receiver section
3001—second receiver section
3100—first receiver seal
3101—first receiver rib or standoff
3102—second receiver seal
3200—second receiver portal base
3201—first receiver portal base
3300—second receiver portal
3301—first receiver portal
3302—second receiver portal and portal base slit
3303—first receiver internal portal slit
3400—first and second clamp type fastener 3500—first and second receiver self-tapping screws or fasteners
3501—first and second receiver bolt or screw-type assembly fasteners (attaches sec. part 1 & 2)
3600—first and second receiver fastener washer seals
3700—first and second receiver apertures for self-tapping screws or fasteners
3701—first and second receiver apertures for assembly fasteners
3702—first and second receiver female threaded inserts
3703—first and second receiver alignment guiding assembly pins
3800—first & second receiver female threaded or non-threaded receiver housings and/or guides
4000—first receiver section
4002—second receiver section
4101—first receiver rounded edge and design
4200—first receiver seal
4201—second receiver seal
4400—first receiver portal
4401—first receiver portal base
4402—first receiver interlocking or engagement portal section
4403—second receiver interlocking or engagement portal section
4404—first receiver male guiding channel structure
4500—second receiver portal
4501—second structure portal base
4502—second receiver female sliding rib engagement structure
4600—first and second receiver clamp type fastener
4700—first receiver self-tapping screws or fasteners
4701—first receiver fastener washer seals
4800—first receiver apertures for fasteners
4850—first and second receiver clamp type fastener
4900—second receiver integral locking pins
6000—receiver
6001—score line or slit
6002—portal base
6003—portal
6004—reinforcement structural ribs
6005—self-tapping screws; fasteners
6006—clamp type fastener
6007—fastener guides
6008—receiver gasket
6009—washer
7000—receiver
7002—portal base
7003—portal
7004—reinforcement structural ribs
7005—self-tapping screws or fasteners
7006—clamp type fastener
7007—fastener guides
7008—receiver gasket
7009—washer
7010—slit, channel or elongated opening in lower portion of the receiver
7011—slit, channel or elongated opening in portal
7012—eye, eye holes, guide holes or clamping collars for fasteners to seal the score line area in lower portion of the receiver
7013—eye, eye holes, guide holes or clamping collars for fasteners to seal the score line area
7014—fastener; bolt
7015—screw head; bolt fastener

DETAILED DESCRIPTION OF THE PREFERRED EMBODIMENTS

One preferred embodiment of the invention is the wall mounted receiver in FIG. 1A-1D that incorporates at least one or a single portal 400 to receive insulated piping or non-insulated piping or a combination of both, and a method to receive a pipe insulation protector with mechanical connecting option 500 (including without limitation, a clamp). This portal and its base combines a unique over molded plastic injection 300 attachment combined with a mechanical attachment, therefore creating a superior bonding method between the wall mounted receiver 100 and the attached portal 400. FIG. 1A incorporates many detailed and useful solutions for the many challenges associated with the wall penetration piping installations and the many challenges to seal these in a professional, effective, long term, and in an aesthetic manner. A portal is also known as a rounded long flange; a long necked opening; tunnel shaped opening; or a tube extension.

In FIG. 1A, the wall receiver 100 can have a predetermined angle 101 range, making it possible to bending and to accommodate the piping inside a wall cavity towards and through the exterior wall within the range 101 required to install and connect, and yet without kinking said piping. The installations using the least possible soldering joints and fittings are the most desirable, because this is a more economical and efficient way to install. This type of installation has other economic benefits as well, as it is a way of minimizing added friction within the fluids for better efficiency and performance of the equipment with improved energy efficiency long term results. The piping fluids are carried by soft copper piping, this copper piping can be bent by the installer only to a certain degree—this is a standard practice used in the plumbing, heating, and air conditioning industry. The other benefit is that insulated piping will be more protected inside the wall cavity from weather degradation, which maintains long term energy efficiency.

Residential and Commercial Energy Model Codes require improved energy efficiency, including the prevention of heat or cold atmospheric air infiltration from coming into the building and/or combining with conditioned air inside the building from exiting the building, which negatively affects the energy consumption of these buildings. In FIG. 1A, a gasket for sealing 200 helps prevent air leakage and wall surface degradation using dissimilar materials, the gasket is assisted by the use of fasteners as shown in FIG. 1A. The wall receiver in FIG. 1A has apertures 800 for to accommodate fasteners; a peripheral flange or rim 900, which support and allows for any added sealing that may be applied (such as weatherproof silicone or caulking) around the narrow edge perimeter or flange 900 of the receiver; and the use of an entry point or points in the wall receiver. The apertures 800 can have integrated sockets for guiding the threaded screws or bolts though the receiver housing.

Figure 2A:
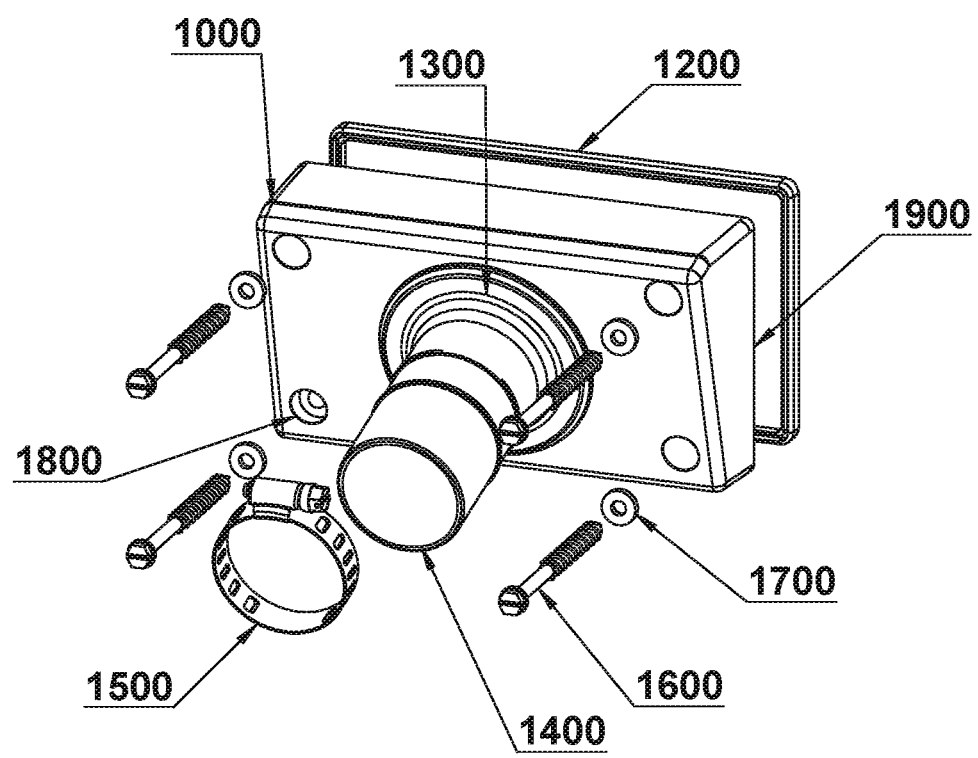
FIGS. 2A, 2B and 2C are a front perspective exploded view, a cross-sectional view and a rear view, respectively, of one preferred embodiment of the invention, which is a one-piece streamlined wall receiver, including the installation hardware.
Figure 2B:
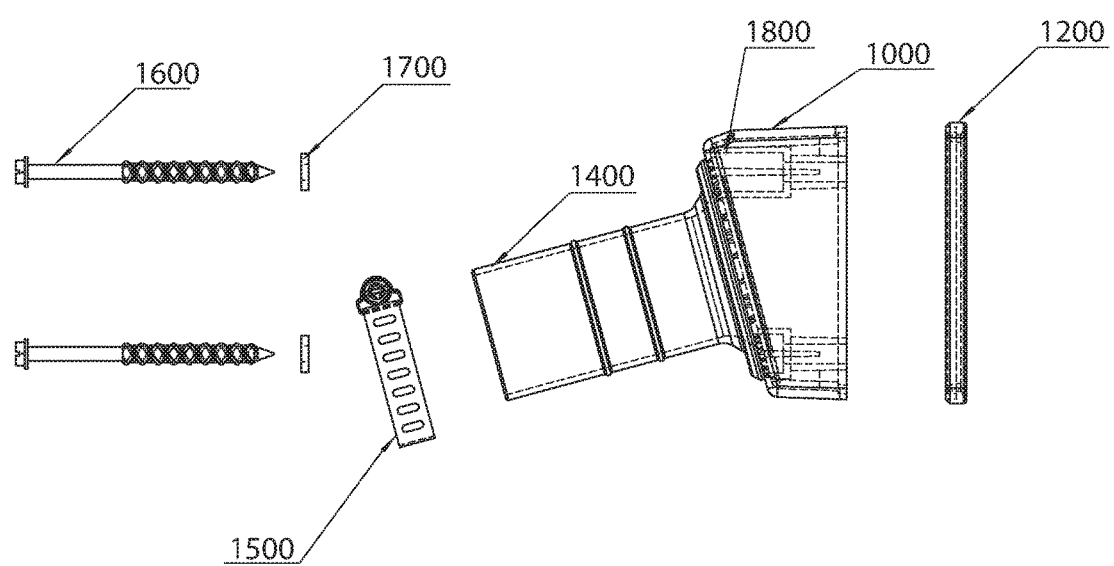
Figure 2C:
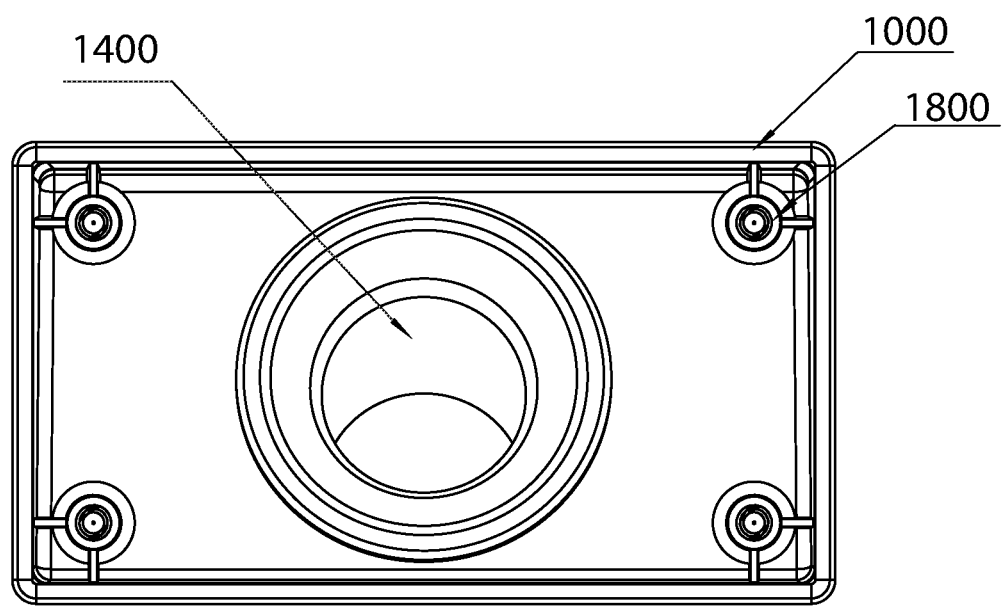
Figure 2D:
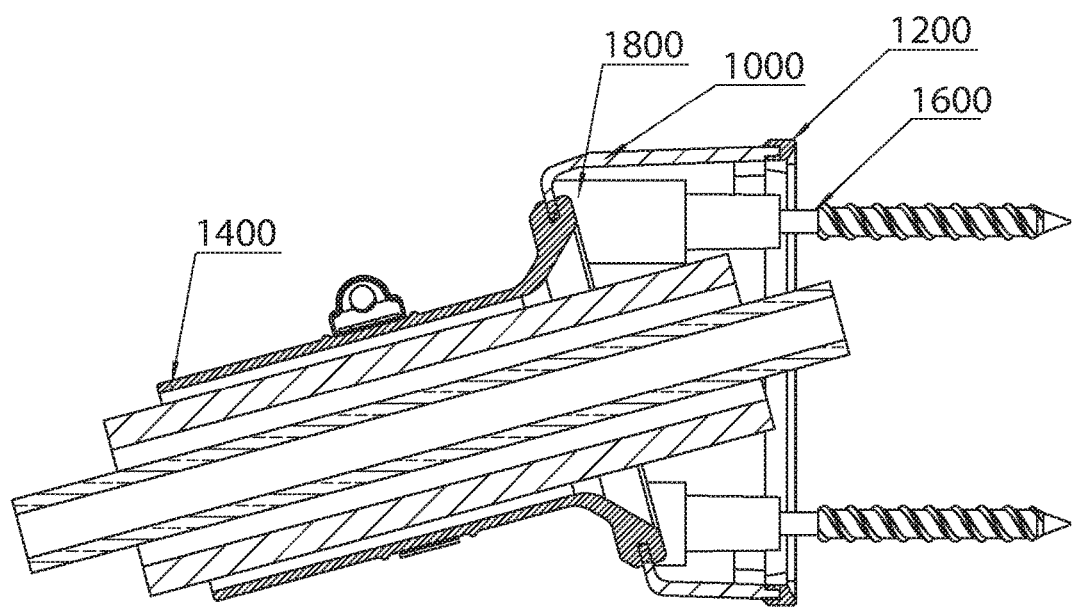
FIG. 2D shows a cross-sectional view of the embodiment in FIG. 2A with piping within the portal section.

The wall receiver shown in FIG. 1A is a preferred embodiment to be installed on its own without the use of any type of wall bracket; as shown in FIG. 1A, the wall receiver has apertures in combination of counter sunk seated areas inside the passageway (as shown in FIG. 2A, 2B) of the aperture guides 1800 to accommodate either the flanged bolts, screws and/or their respective seal washers, and to accommodate a multiple amount of fasteners that are available for the installer's choice and that are capable of going through the receiver and wall area, using self-tapping screws

600, bolts, anchor fasteners, toggle fasteners, or any combination of the like. The wall receiver installation hardware fasteners help deter air leakage with use of washers or washer seals 700 with each fastener.

The wall receiver can have at least one or a one single portal that goes over the wall receiver openings. The portal 400 and the portal base 300 are attached to the wall receiver by the use of elastomeric material over molding or an attached molded sandwich type insert positioned through the use of a channel and a perforated area in the wall receiver. In FIG. 1A, the portal has multiple internal cut score lines 403 and/or designated area guidelines so the installer can cut to the desired fit size on the job.

As shown in FIG. 1A, there can be at least one or multiple raised lines or guides 401 that can combine to designate the area 402 for clamp or ring fasteners; these at least one lines or guides 401 can also be cutting line guides 403 or score lines with integral weakened or exterior or internal thinner material lines for cutting to the required length. The single portal can have a continuous long neck 400 area shown in FIG. 1A and has an inlet passageway continuance that conventional roof flashings lack; it incorporates an internal passageway area for a higher degree of air leakage deterrence. At the same time, the exterior portal 400 neck area allows for piping vibration control, weather resistance, and a tamper-resistant connection with the insulated piping and or its respective protector with the added security of mechanical type clamps or fastener apparatus 500 (FIG. 1A) to secure to the portal 400. The portal neck 400 can be made of a highly resilient and resistant plastic. The portal 400 and its portal base 300 can be attached by plastic over molding, snap on fastening, bolts, threaded attachment, inserted or other co-acting fastening components. The wall receiver, portal 400 and or the portal base 300 can have a threaded connection (either molded, or attached to its construction) to assist in connecting an optional pipe insulated protector with the wall receiver and at the same time serving as a portal inlet passageway. The portal inlets and diameters as shown in FIG. 1A can be sized in multi-diameter portal sizes 400 and with score lines for cutting to the desired diameter that is required to be fitted and or connected to.

In one embodiment, both sides of the portal surface neck 400 area and its internal area, are able to be sized for a single diameter passageway or a multiple diameter passageway of pipe and/or conduit types or wiring with rib type or non-rib type formations 404 of any shape, size or pattern, which increase sealing against air leak and/or piping vibration. In another embodiment, this can also be used by a step-down or tapered diameter downsized constructed portal. In another embodiment, the shape of the portal can also be configured to the shape or shapes of the insulated piping including irregular shapes.

Another preferred embodiment (FIG. 2A-2D) shows a streamlined wall receiver that fits in tighter space areas to be installed whether there is limited wall siding surface type or if the piping is installed close to the bottom edge of the wall etc. FIG. 2A shows a non-rim lip 1900 or flange area, which is located at the peripheral edge of the wall receiver 1000. FIG. 2A shows a seal 1200 of the edge of the perimeter 1900 that is attached and over molded; the wall receiver also has a single 1400 portal base 1300 attached to it with injection plastic bonding and/or a mechanical bond or a combination of both. FIG. 2A shows the apertures 1800 to accommodate the fasteners including bolt or screw head integral seating; FIG. 2A shows a clamp 1500 for attachment of piping and connection of an optional pipe insulation protector, and also for vibration control of the refrigerant piping is represented; there are also hardware and fasteners 1600 and washers 1700. The shape of the receiver body is shown as square or rectangular, but other possible embodiments can have varied shapes and dimensions and different angled face portions.

Another preferred embodiment (FIG. 3A-3C), which improves and assimilates to the wall receiver on FIG. 1A, shows a wall receiver 2000, which employs a two-piece design: a first section 2000 and a second section 2900. The preferred embodiment in FIG. 3A allows the installation of the wall receiver 2000 to be installed and/or removed, without the need for cutting existing refrigerant piping; this embodiment is intended for upgrading the building or retro fitting to current energy code and building code compliance without the high cost of labor to reconnect the piping and the dangerous release of these type of chemicals into the ozone carried by the refrigerant piping.

Figure 3A:
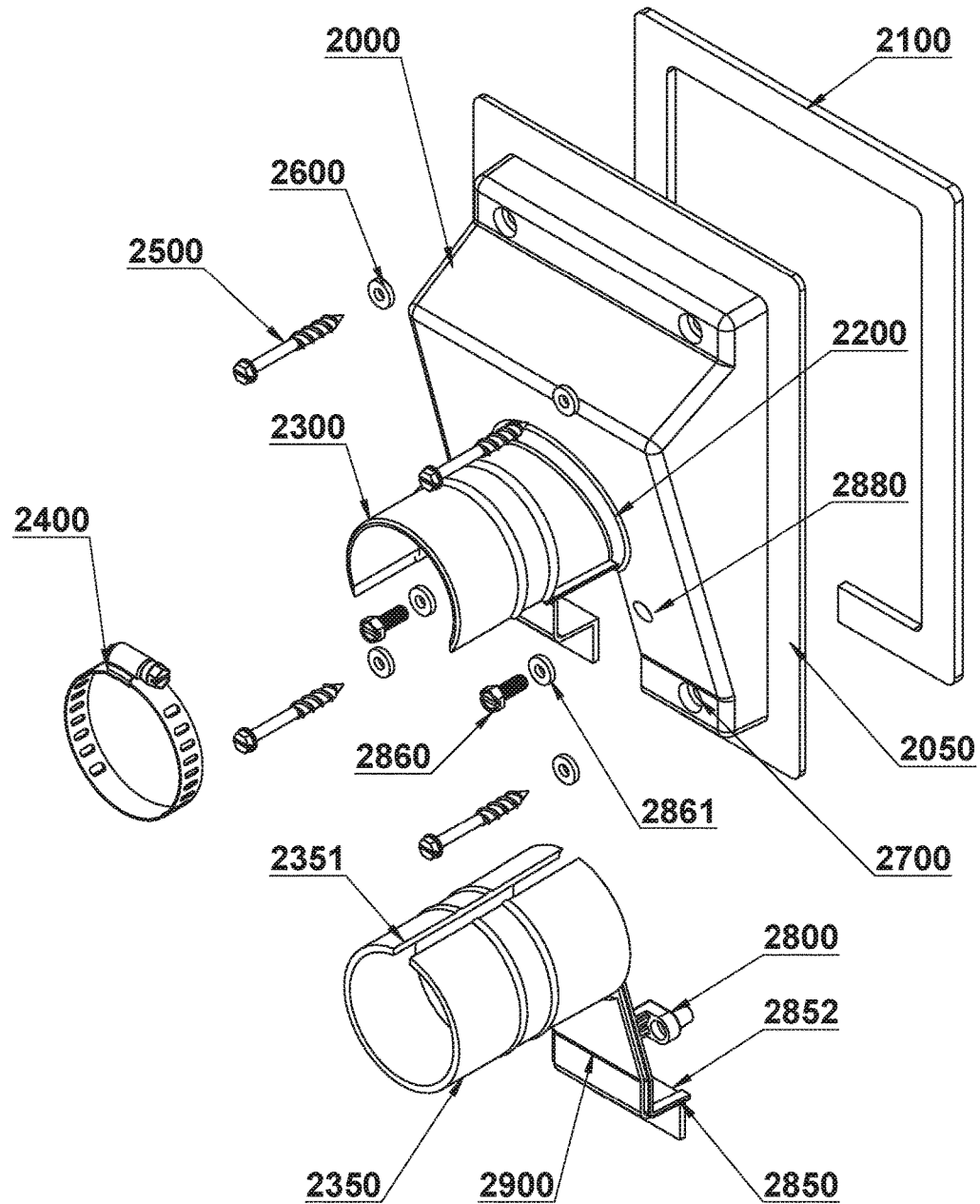
Figure 3B:
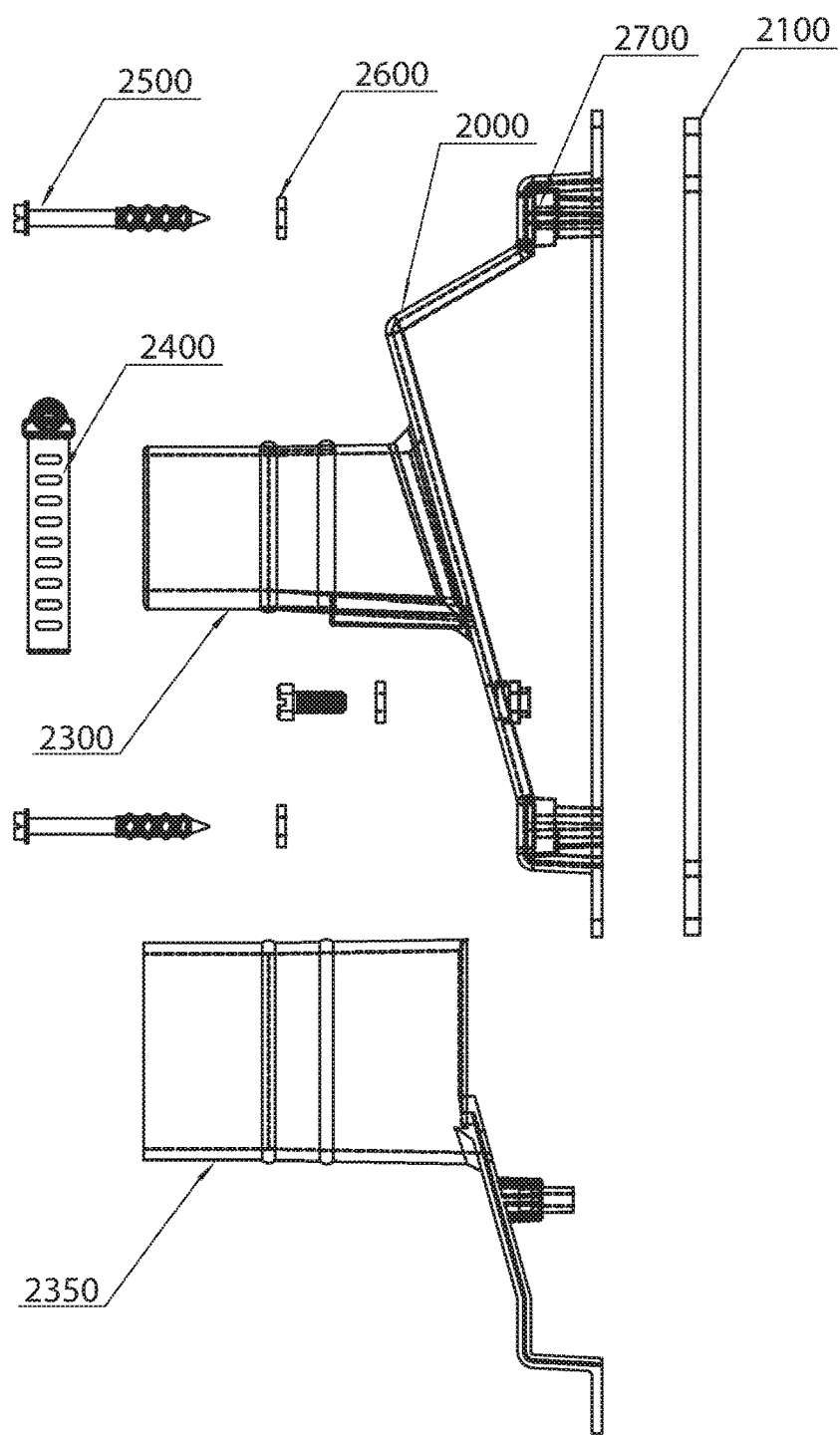

FIG. 3A shows a second section 2900 of the wall receiver that can be detached and reattached to facilitate and allow the installation over existing piping, and all in an aesthetic, economical and safe environmental way, which also incorporates energy efficiency with a seal 2850 between the first section 2000 and the second section 2900 to prevent or deter air leakage; the peripheral rim or flange in second section 2900 also incorporates a gasket on the back side of said peripheral rim or flange 2852.

FIG. 3A shows an engagement apparatus in second section 2900 of an integral female thread part 2800 or retainer housing, which is located on the back side of the second section 2900, to accommodate a female thread insert and an aperture in the front side 2880 (on the first section 2000) to allow the passage of a screw or bolt fastener 2860 and its respective seal washer 2861, for engagement with said integral female thread part 2800; this type of engagement apparatus allows for attachment of sections 2000 and section 2900 to each other to create one single unit; this type of engagement also allows for removal of the first section 2000 from the second section 2900. FIG. 3A also shows a gasket 2100 attached to the peripheral rim or 2050 flange area, for wall sealing.

In FIG. 3A, there is a sectional portal 2300, which can be of the same rigid type material as the receiver 2000 or a flexible material; there is a sectional base 2200 that may also be of a rigid type material or a flexible material; there can be used the same material of the wall receiver 2000 for attachment to the 2-piece 2000 wall receiver. This embodiment also features a first portal section 2300 and its base 2200 and a second portal section 2350 to engage; said second portal section 2350 incorporates a slit or an elongated opening 2351; the second portal section 2350 wraps around the first portal section 2300, so that said both the first and second portal sections become one single integrated unit. The slit can also be an elongated opening that is parallel with the axis of the portal.

FIG. 3A shows apertures or channels 2700 for accommodating the installation fasteners, screws or bolts. FIG. 3A shows a clamp or portal fastener 2400 and wall receiver installation hardware that comprises screws or self-tapping screws 2500 and respective washers 2600. The preferred embodiment of FIG. 3A also may employ countersunk seated areas shown on FIG. 2A inside the passageway of the aperture guides 1800 to accommodate flanged bolts, screws and washers.

The receiving or receiver housing can have a first receiving housing section and a second receiving housing section; the first and the second receiving housing sections can be removably connected with various connection devices, such as a male connector piece and a female connector piece;

slot/groove connection; and/or fastener connections; additionally, the portal can comprise multiple pieces or section: first and second portal sections or an upper and a lower portal section; the portal sections can have integral apertures for receiving and guiding screws, bolts or fasteners in one or multiple angles.

Figure 4A:
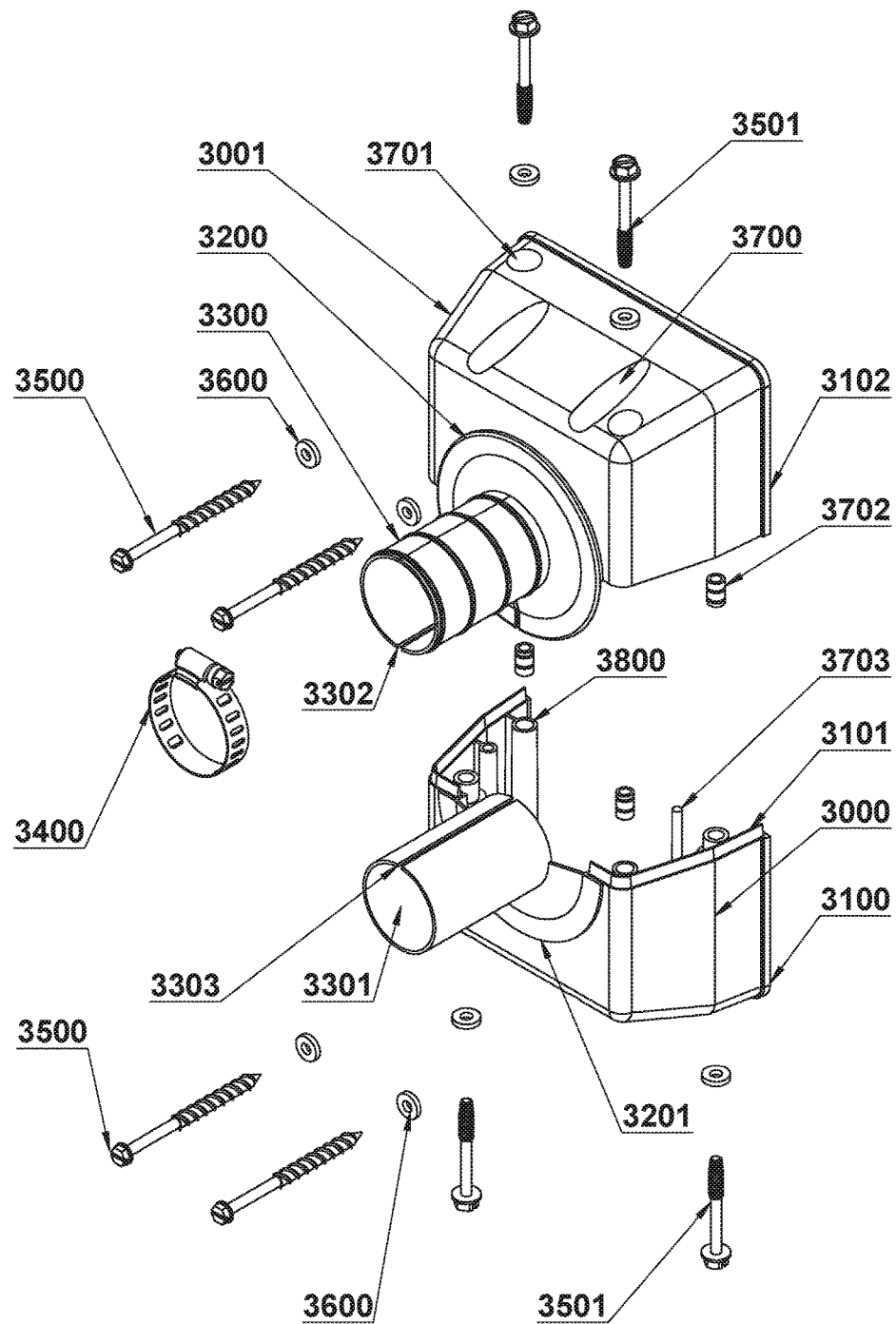
FIGS. 4A, 4B, 4C and 4D are a front perspective exploded view, a right-side exploded view, a rear exploded view and a cross-sectional view, respectively, of one preferred embodiment of the invention, which is a 2-piece section wall receiver, including the installation hardware.
Figure 4B:
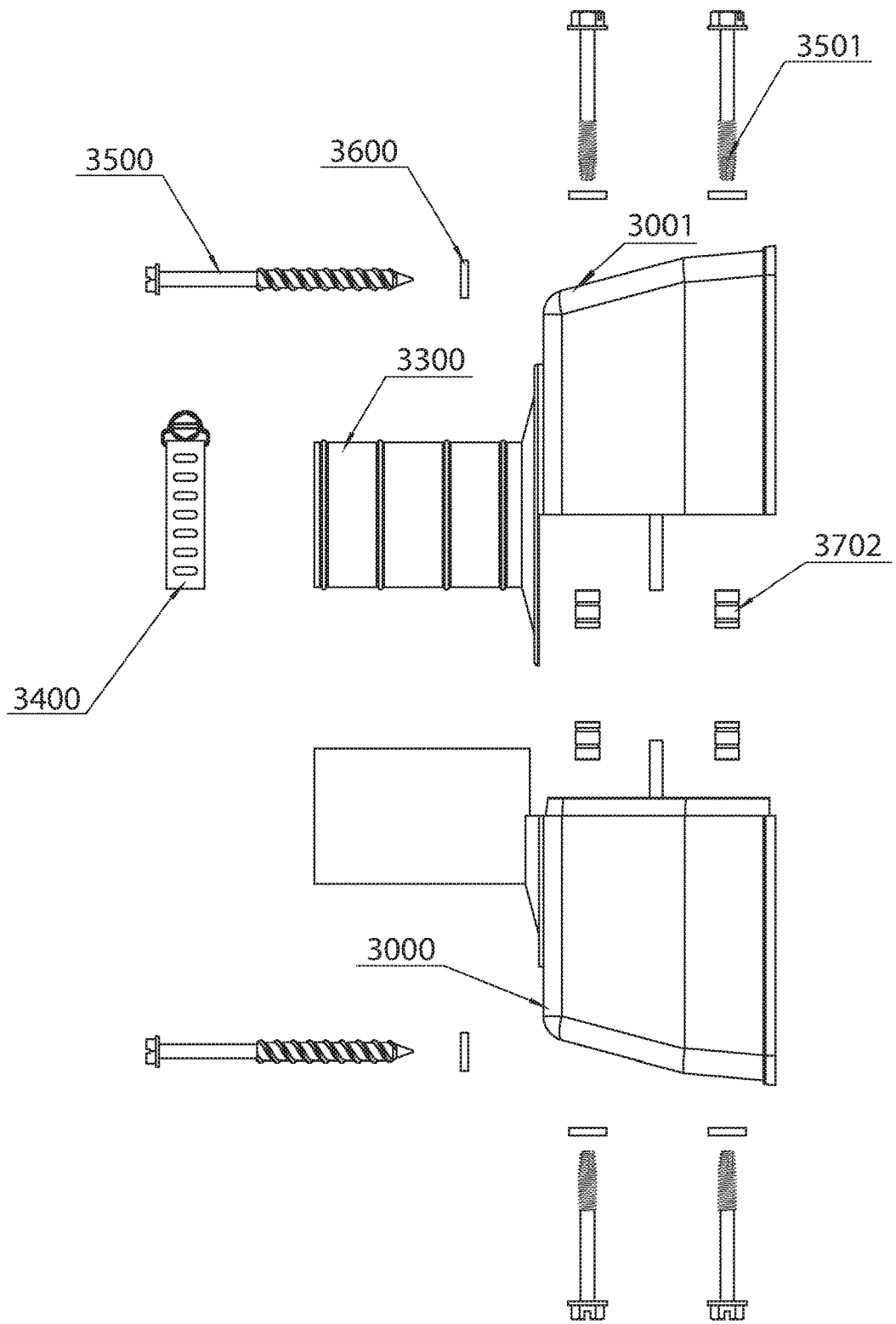
Figure 4C:
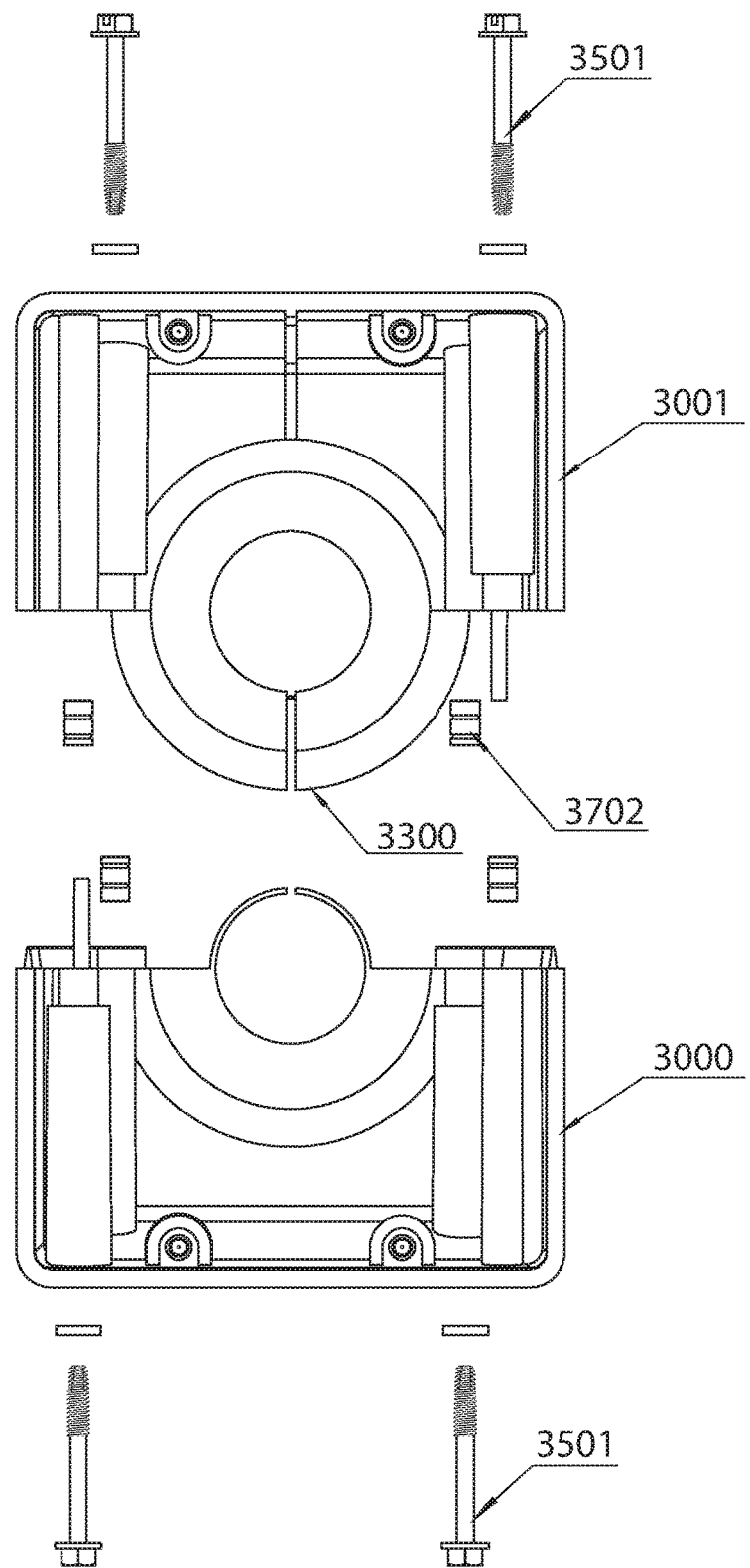
Figure 4D:
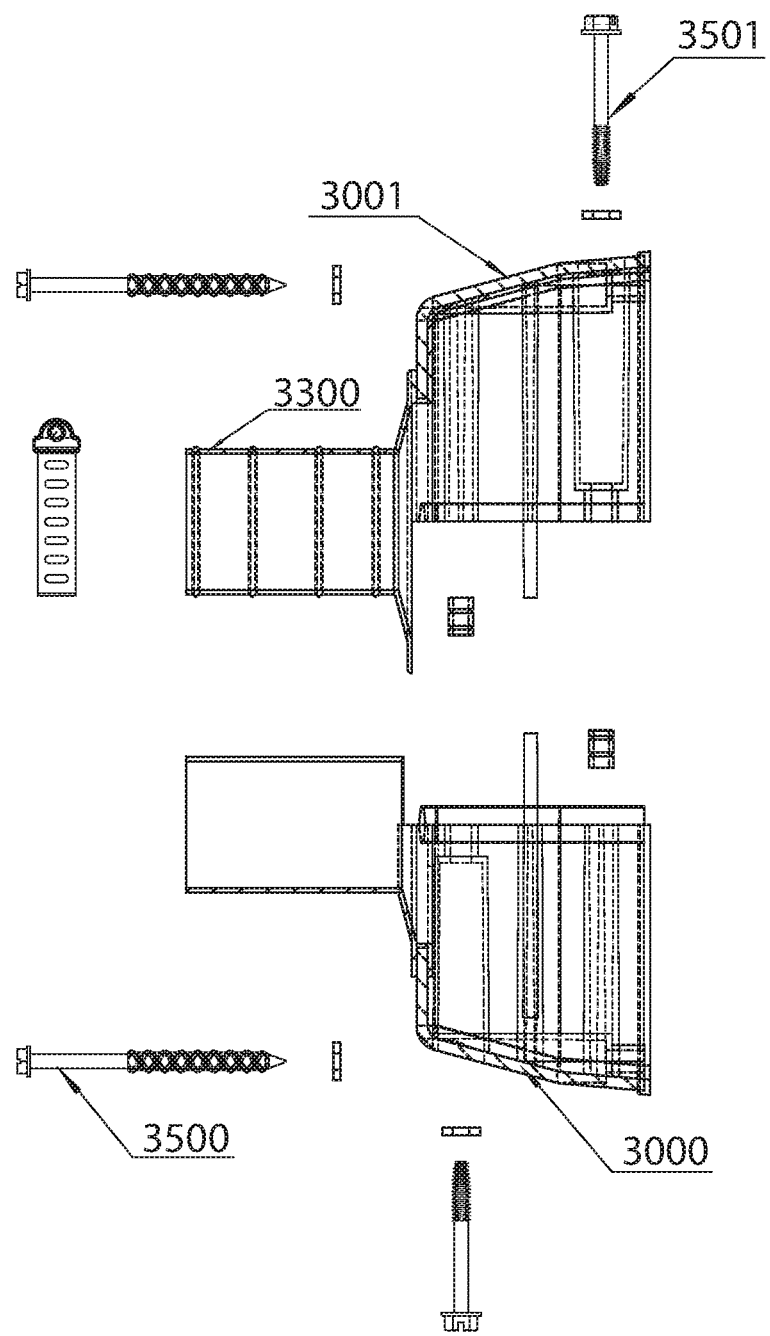

Another preferred embodiment (FIG. 4A-4D) features a two-piece design wall receiver: a first section 3000 and a second section 3001. This embodiment of the wall receiver is needed when a retro fit installation is required without the need to cut the existing piping and the associated costs evolved to reconnect said piping. The preferred embodiment in FIG. 4A has an upper, composed or second receiver section 3001 (having a channel) and a first receiver section 3000 (having a rib or slide type engagement part 3101); these structures assist in the alignment and engagement of both the first and the second sections to become one single receiver unit, with further assistance of guiding assembly pins 3703. The preferred embodiment of FIG. 4A also features seals (second seal 3100 and first seal 3102 respectively) all around the perimeter of each section 3000 and 3001 of the wall receiver; FIG. 4A shows a multi-piece portal portion: a first portal portion 3300 and a second portal portion 3301. The first portal portion 3300 has a first portal portion slit or elongated opening 3302 and the base portion 3200; there is an internal portal sleeve 3301, which includes an internal port sleeve slit or second port sleeve slit or elongated opening 3303 and its base or second portion base 3201; the internal port sleeve 3301 can fit inside the first portal portion 3300; this multi-piece portal portion also features multiple designated areas. In other embodiments, the internal port sleeve 3301 can fit over the first portal portion 3300.

FIG. 4A shows a clamp type fastener 3400 that goes directly over the portal 3300. FIG. 4A shows installation fasteners that are all material self-tapping screws 3500 and include washer seals 3600 to prevent air leakage. The embodiments described here are not to be limited to a certain type of screw, bolt or fastener. FIG. 4A shows machined assembly screws 3501 that facilitate and join wall receiver first section 3000 and wall receiver second section 3001 into one single unit. FIG. 4A shows multiple apertures 3700, which may be shaped in different patterns, depths or orientations, and to accommodate the fasteners used to anchor and attach the wall receiver to the wall. FIG. 4A shows assembly apertures 3701 that accommodate and facilitate the machined assembly screws 3501. The wall receiver features internal assembly pins to guide and facilitate the engagement of the first section 3000 and the second section 3001 by the use of the machined assembly screws 3501, which will engage with mechanical inserts 3702 that are either threaded or mechanically bonded or a combination of both to assist in the attachment of both sections of the wall receiver 3000 and 3001 to each other and to assist both sections 3000 and 3001 to become a single integrated unit. To secure the first and the second receiver sections, other types of fasteners can also be employed, including a locking clip or a retainer that can be locked.

FIG. 4A shows female threaded or non-threaded housings or guides 3800 that receive machined assembly screws 3501 and female type inserts 3702, and to also assist and to create one single unit. The preferred embodiment of FIG. 4A also may employ countersunk seated areas shown on FIG. 2A inside the passageway of the aperture guides 1800 to accommodate either the flanged bolts, screws, and/or their respective seal washers.

Figure 5A:
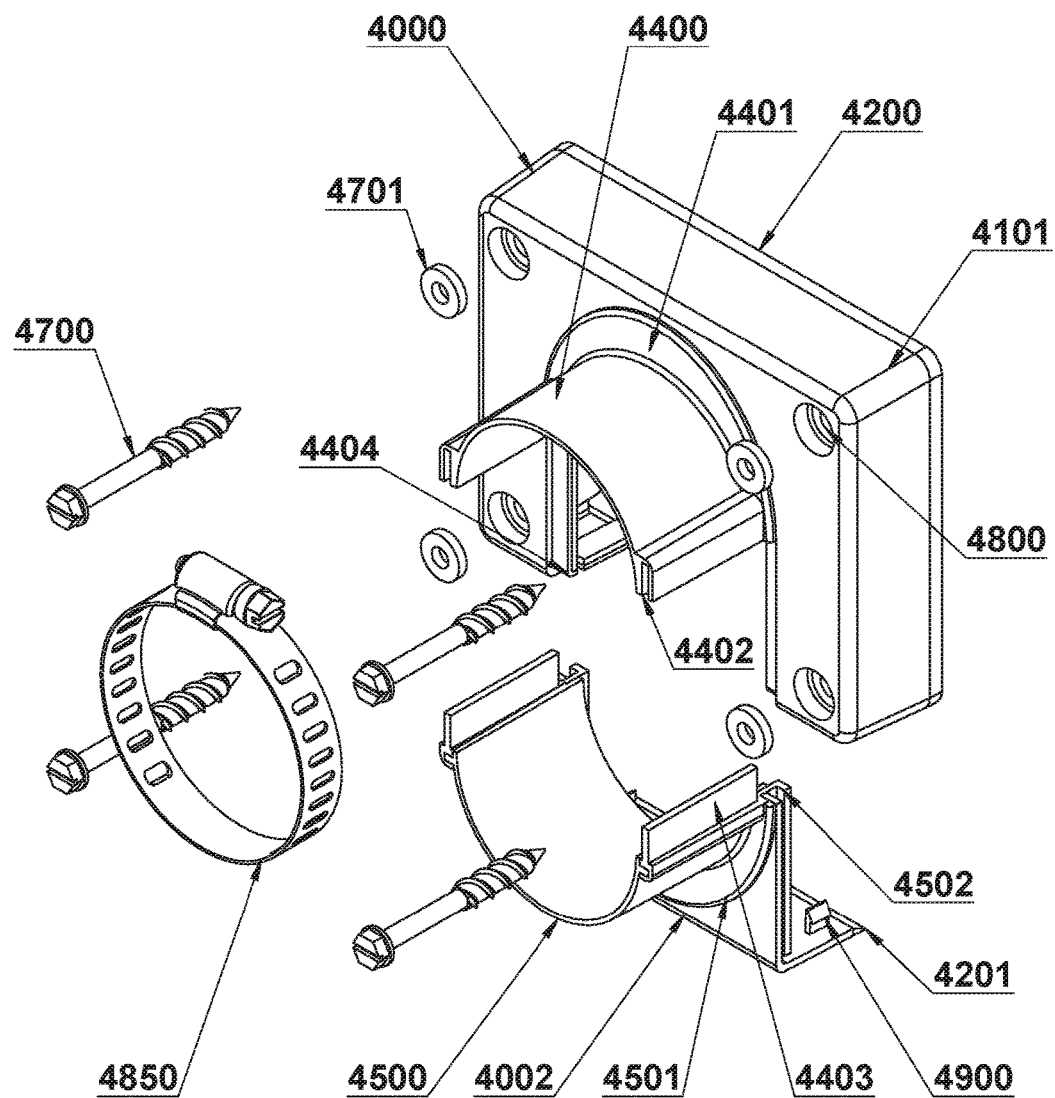
FIGS. 5A, 5B and 5C are a front perspective exploded view, a cross-sectional view (from right side) and a front view, respectively, of one preferred embodiment of the invention, which is a 2-piece section wall receiver, including the installation hardware.
Figure 5B:
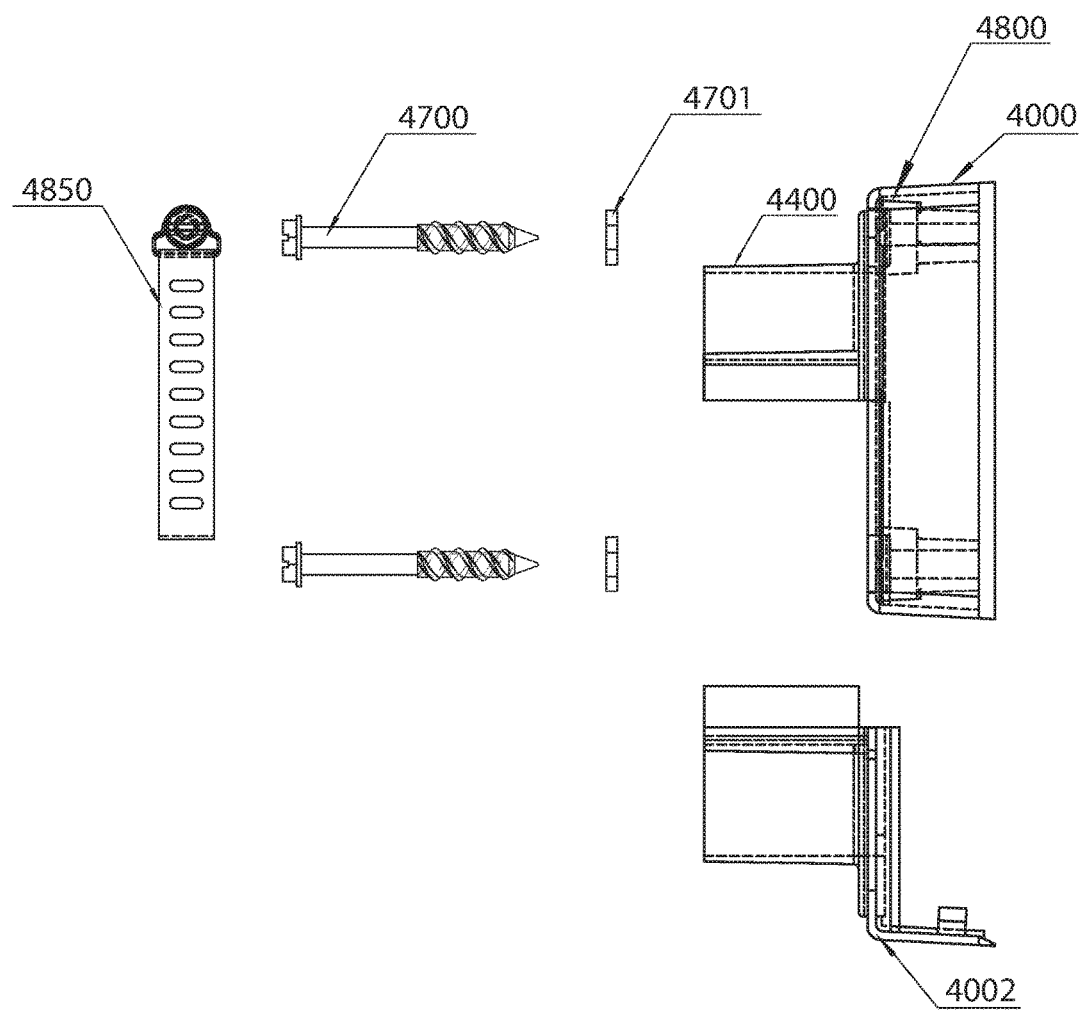
Figure 5C:
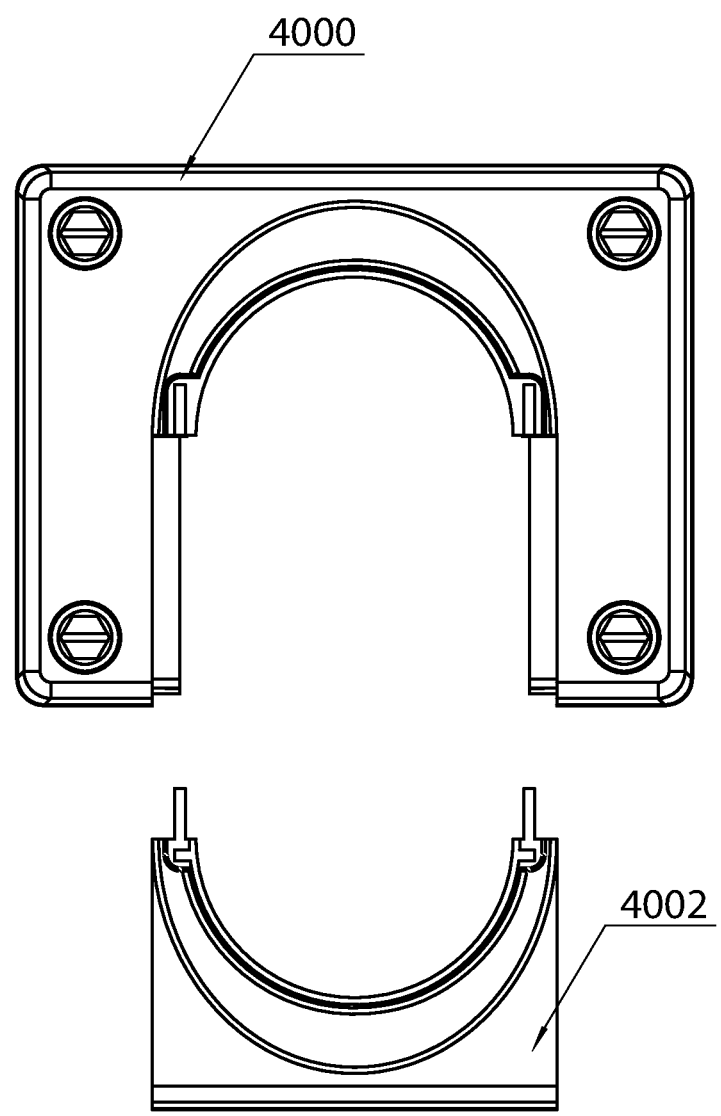

In another preferred embodiment (FIG. 5A-5C), the wall receiver 4000 is a two-piece system that serves as a streamed lined retrofit unit so that the existing installations and connections of piping do not require cutting of the piping to be installed; there is a first wall receiver section 4000 and a second wall receiver section 4002 that can be attached or interlocked to each other to form a single unit. FIG. 5A shows a second or smaller section body 4002, which attaches to the first section or larger section body 4000 to create one single unit. The relative size of the first or second sections can vary depending on the application and is not intended to be limiting.

The preferred embodiment of FIG. 5A can use an elastomeric-type or flexible and weather resistant material 4200 and 4201 around the edge of both of the receiver sections 4000 and 4002, respectively, and to seal effectively against the wall. FIG. 5A shows a first portal section 4400 and a base 4401 of the first portal section and a second portal section 4500 and a base 4501 of the second portal section; and this embodiment may comprise the same rigid material and/or elastomeric material of the first wall receiver section 4000 and the base 4401. These multiple sections may also employ a flexible elastomeric material or a combination of both rigid material and elastomeric material.

In one preferred embodiment, both sections of the portals 4400 and 4500 and their respective bases engage or co-act with each other to create one single unit. The interlocking portal section areas 4402 and 4403 are co-acting fasteners or act in a male/female interaction and create one single portal unit; this apparatus can use a clamp-type fastener 4850 that may be also shaped like the said joined portals, and said portals may comprise the same rigid material or flexible elastomeric material or a combination of both type materials. The preferred embodiment also incorporates added co-acting engagement of receiver sections 4000 and 4002 with a male portion or guiding channel structures 4404 and a female portion or sliding rib engagement structure 4502, and there can be integral locking pins or clips 4900; these structures help to assist and to assemble the pieces of this embodiment into a single unit. The preferred embodiment of FIG. 5A shows a clamp type fastener 4850 that secures around the portal sections of 4400 and 4500. The wall receiver can utilizes attachment devices, such as self-tapping fasteners 4700, to secure the wall receiver to the wall including washer seals 4701. In FIG. 5A, the first receiver section 4000 has apertures 4800 to accommodate the self-tapping fasteners and assist in securing the first wall receiver section 4000 to the wall. The preferred embodiment of FIG. 5A also may employ countersunk seated areas shown on FIG. 2A inside the passageway of the aperture guides 1800 to accommodate either the flanged bolts, screws and/or seal washers.

Figure 6A:
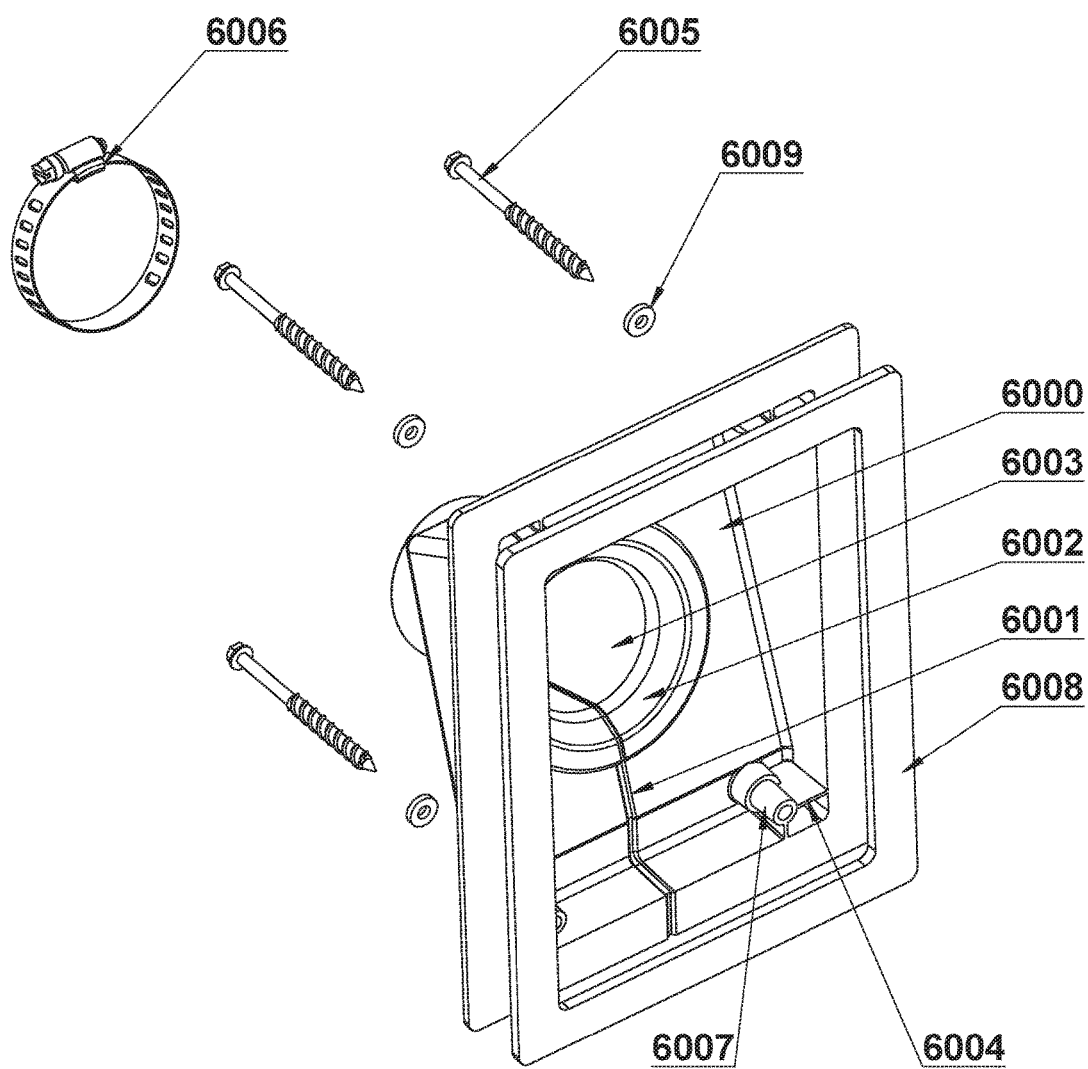
FIGS. 6A, 6B, 6C and 6D are a rear perspective exploded view, a front exploded perspective view, a cross-sectional view (from right side) and a rear view, respectively, of one preferred embodiment of the invention, which is a 1-piece slit wall receiver that may also feature a cut score line option and the installation hardware.
Figure 6B:
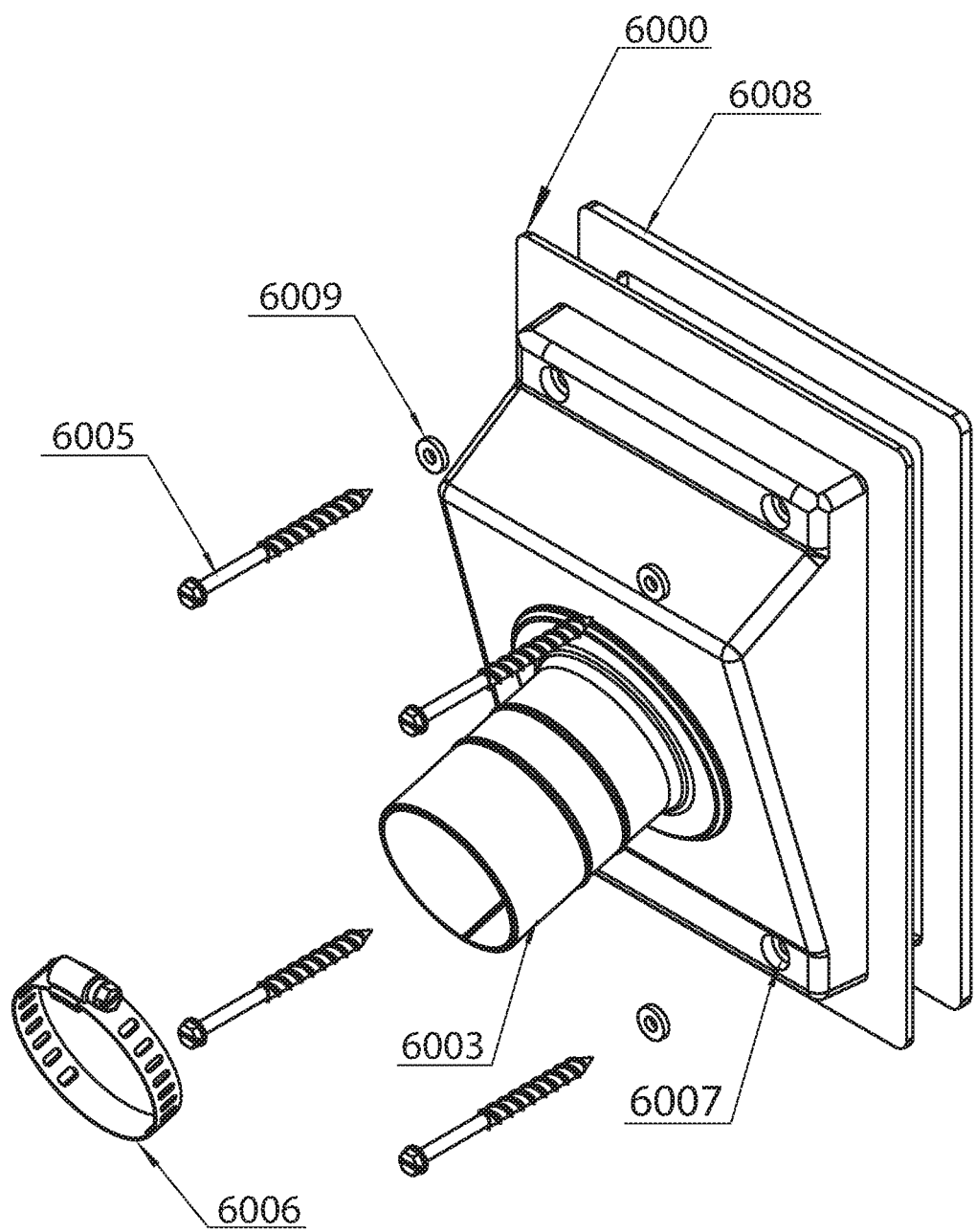
Figure 6C:
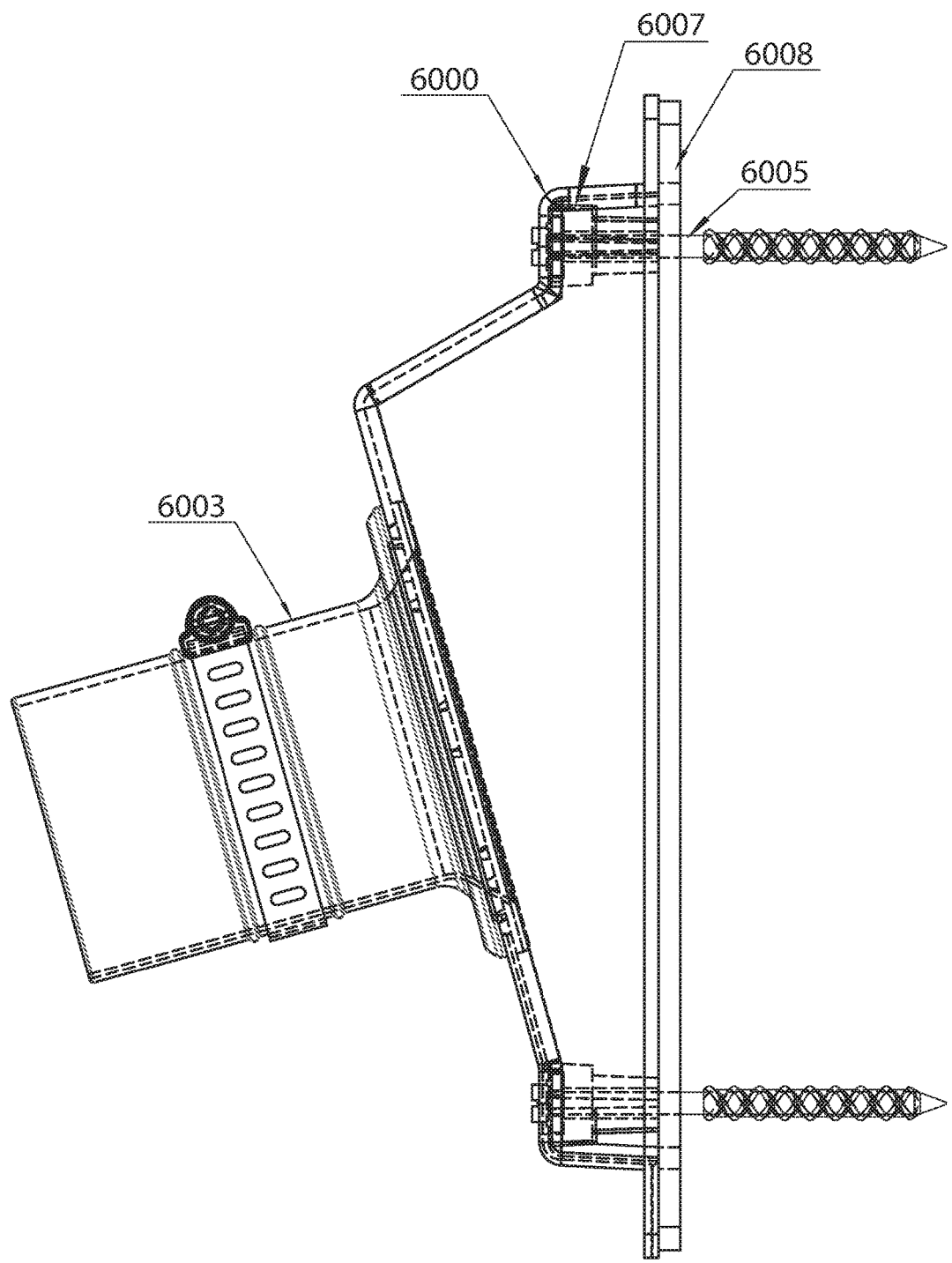
Figure 6D:
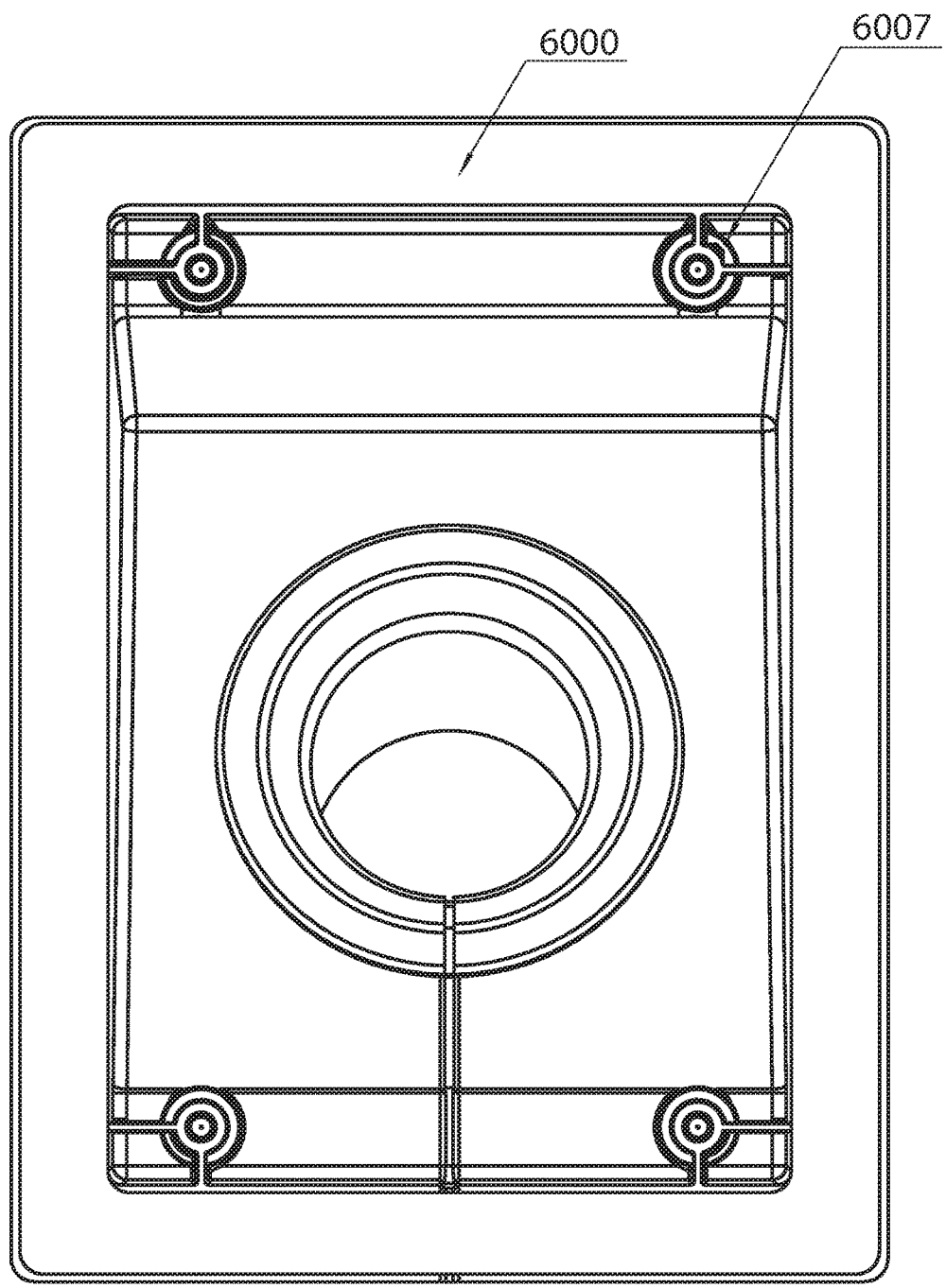
Figure 7A:
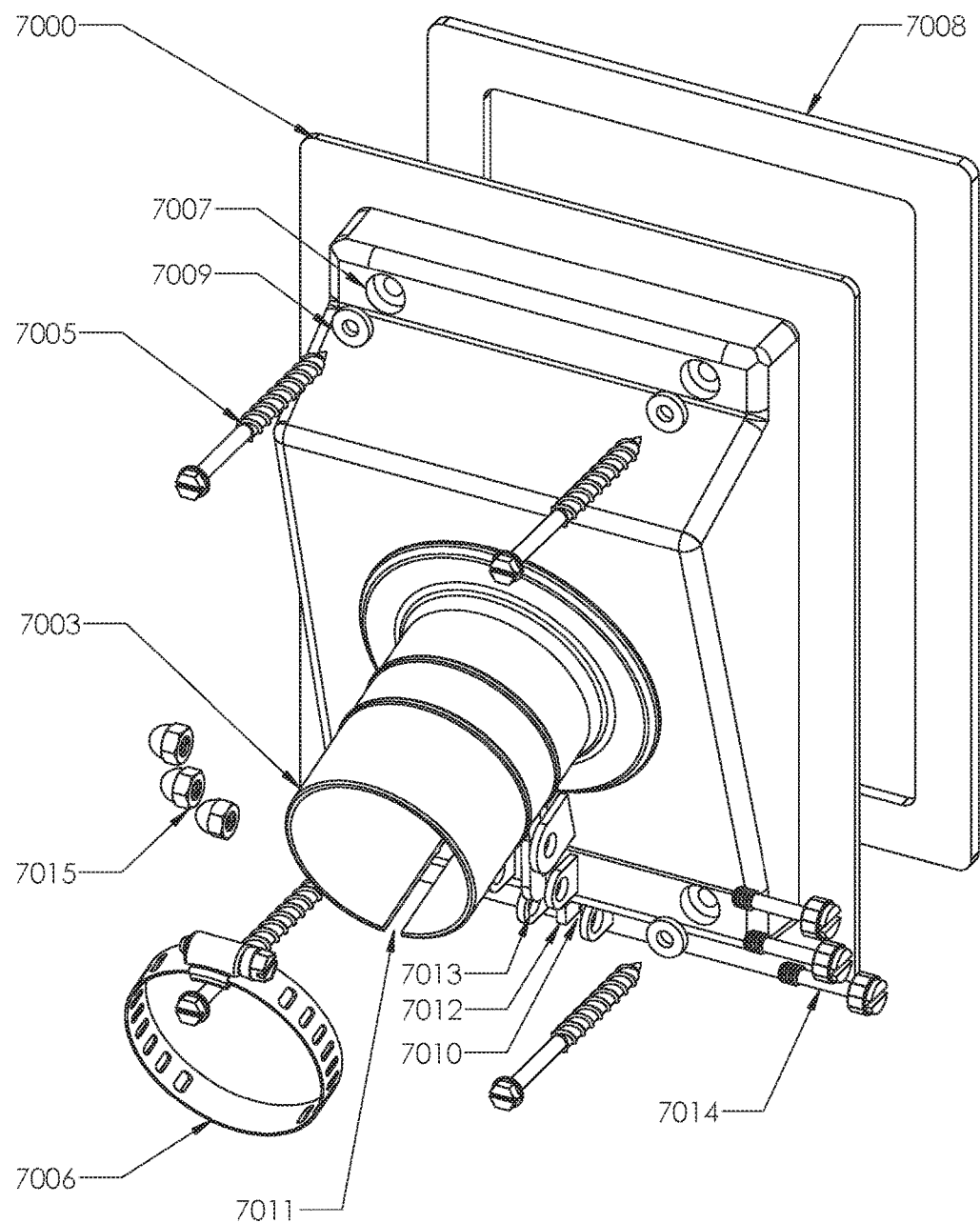
FIGS. 7A, 7B, 7C and 7D are a rear perspective exploded view, a front exploded perspective view, a cross-sectional view (from right side) and a rear view, respectively, of one preferred embodiment of the invention, which is a 1-piece slit wall receiver that may also feature a cut score line option and the installation hardware. In this preferred embodiment, the channel, elongated opening or slit can be pre-scored for the installer to cut and allow slitting or it can be manufactured as a "Pre-Slit Opening" to include over molded gasket within the elongated opening, channel or slit or a combination of both.
Figure 7B:
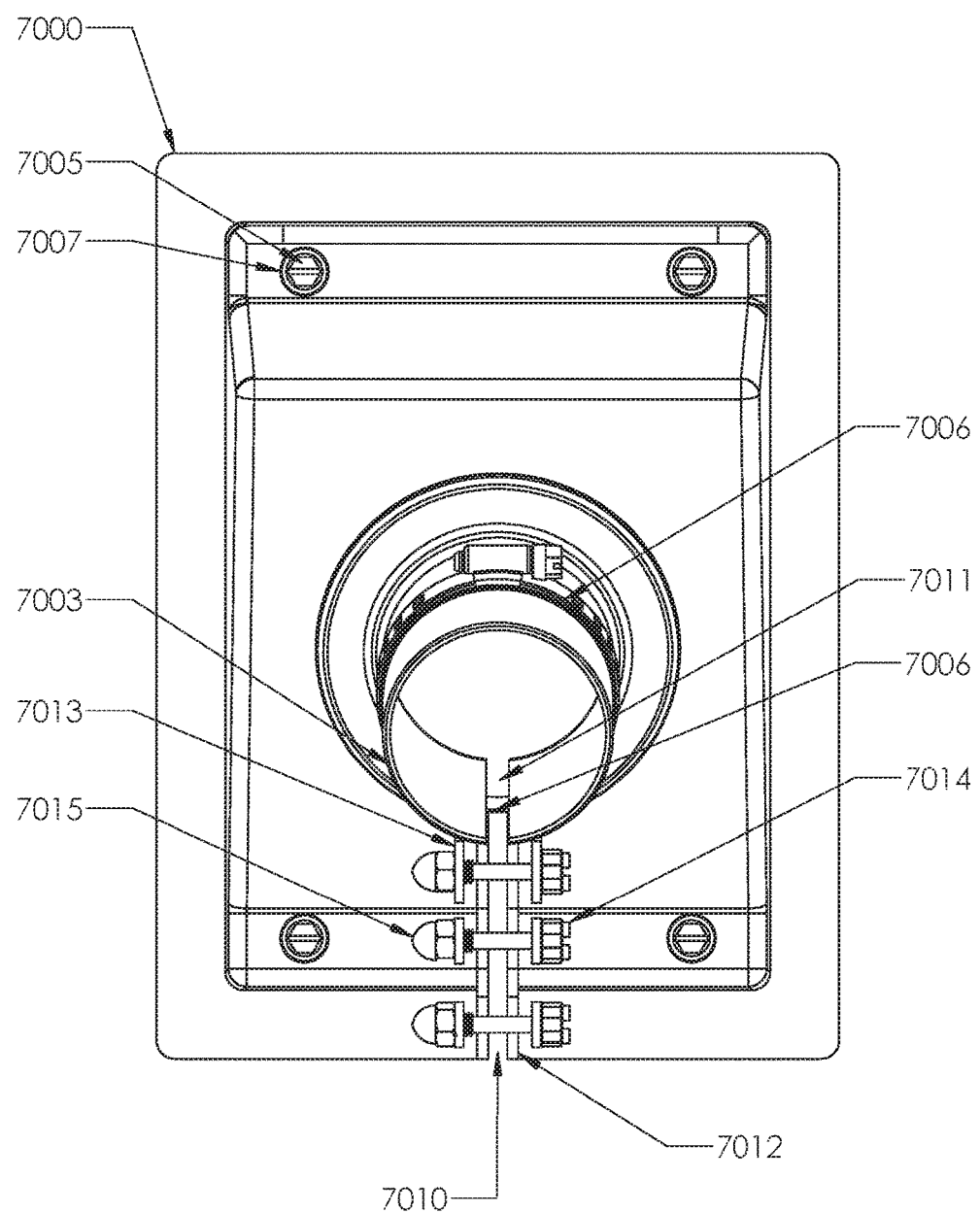
Figure 7C:
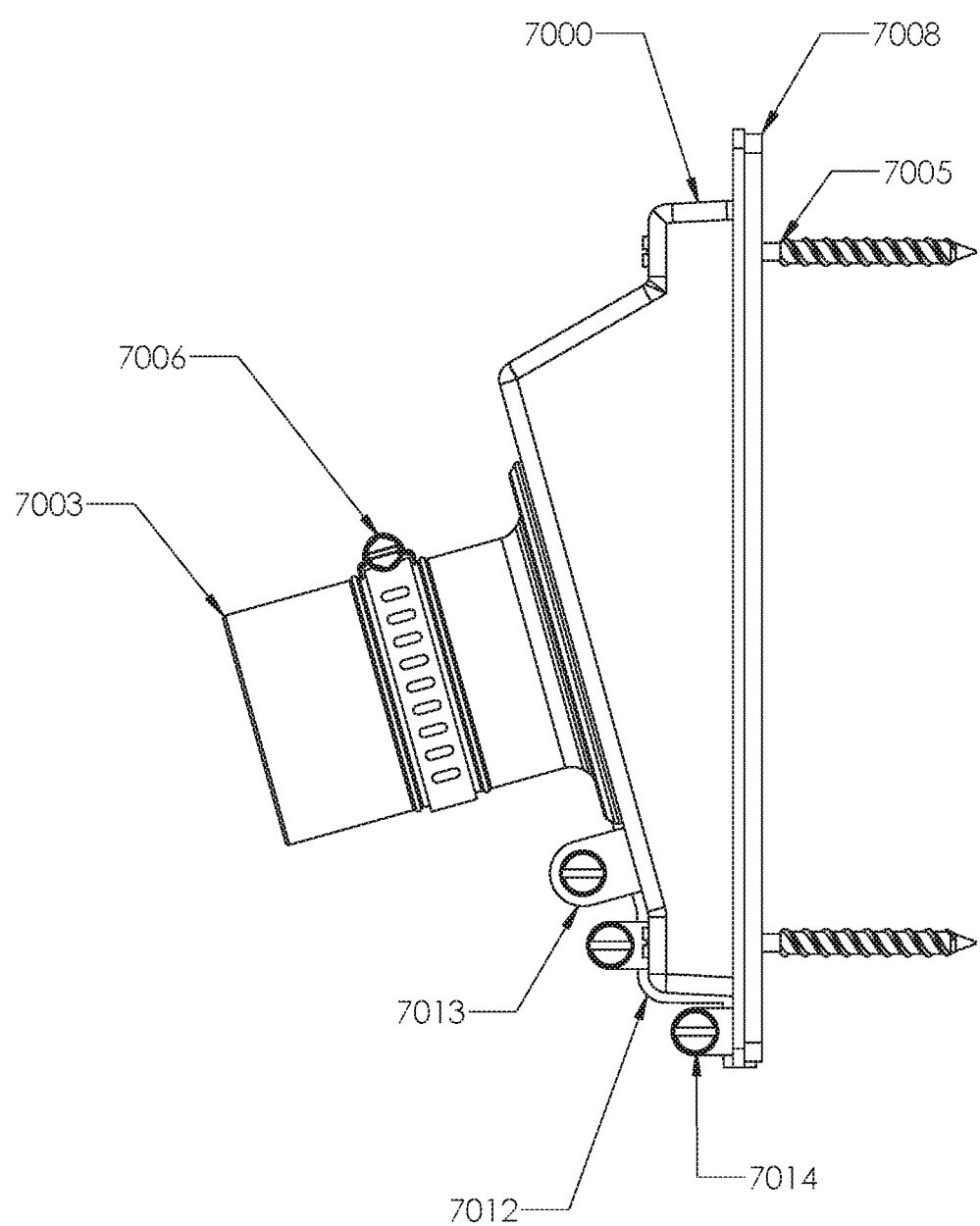
Figure 7D:
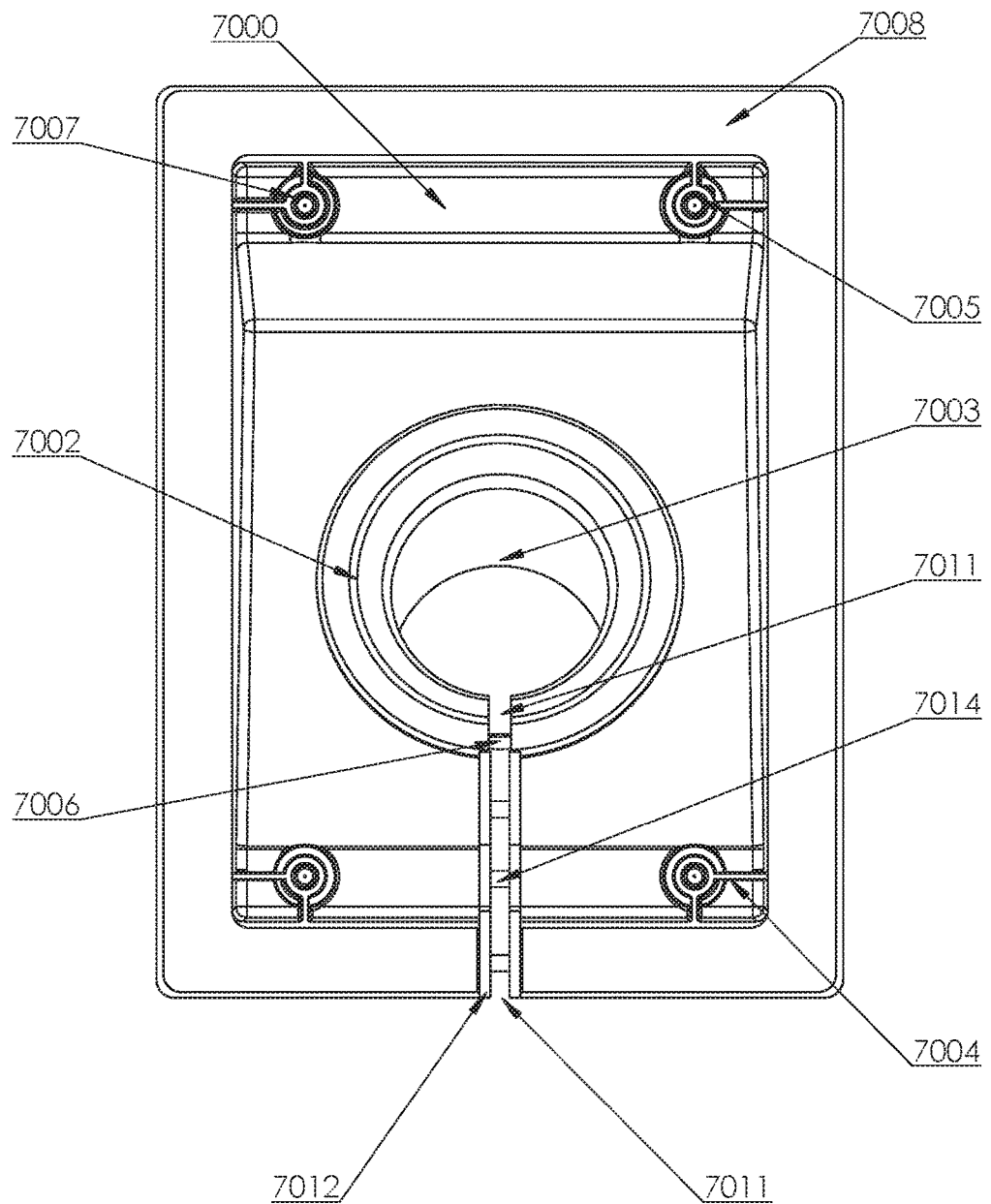

The preferred embodiment of FIG. 6A-6D illustrates a wall receiver 6000 that is similar to the preferred embodiment shown on FIG. 1A, however the wall receiver shown on FIG. 6A can be used as a non-slit unit or as an optional retrofit alternative, that has either a complete slit (or an elongated opening or channel that is parallel with the axis of the portal) at the bottom region of the receiver 6001, including the bottom of portal base 6002, and to continue throughout the bottom of the portal area 6003.

In another alternative, instead of a complete slit or opening, there is a predetermined and weakened cut-score line 6001 on the back side of the wall receiver 6000 and on the back side of the portal base bottom 6002 and to continue throughout of the internal passageway of the portal bottom area internal side 6003. This cut-score line may not actually cut through the receiver wall or the portal wall. The preferred embodiment features is an economical alternative for the installer that may or may not require the need for a retrofit option. Other embodiments may have a complete slit, elongated opening on slit on the portal and/or the housing.

As shown in FIG. 7A to 7D, the preferred embodiment of FIG. 6A may employ retention elements with clamping holes to accommodate fasteners near the slit or elongated openings; the can be co-acting built in or non-built in fasteners or the simple use of built in eyelet or eyelets and bolt or bolts and nut fastener or nut fasteners in the front side or on the back side of the wall receiver to seal or close the slit—only if required by the installer. See FIG. 7A to FIG. 7D, wherein there are also guide holes, eyes or collars that allow for placement of fastener bolts and screw heads to secure the two sides of the lower portion of the portal and the receiver together near the slit areas.

The slit may or may not need to employ a seal as this can also be accomplished with the use of solvent welding, bonding glues, or a separate pre-engineered component and again, only as an option, if required. The preferred embodiment of FIG. 6A may also use: glue, seals, caulking, integral or separate co-acting snap fasteners, or the use of integral eyelets with nut and bolt fasteners on either side of the wall receiver.

The preferred embodiment of FIG. 6A just like the wall receivers on FIGS. 1-5 all may also employ the use of integral re-enforcement structural ribs 6004 and the use of fastener guides 6007. The preferred embodiment of FIG. 6A can also use the all material self-tapping screws 6005 and their respective washer seals 6009, also shown in FIGS. 1-5. These types of self-tapping fasteners 6005 are employed as a standard in the building industry and may require a certain amount of torque that allows a secure wall receiver attachment to the wall.

To prevent piping vibrations, the portal can also use clamp type fasteners 6006 and a perimeter gasket 6008, which helps to deter air leakage and to protect the surface wall from degradation due to the piping vibration. The preferred embodiment of FIG. 6A also may employ countersunk seated areas shown on FIG. 2A inside the passageway of the aperture guides 1800 to accommodate either the flanged bolts, screws and/or their respective seal washers.

Figure 8:
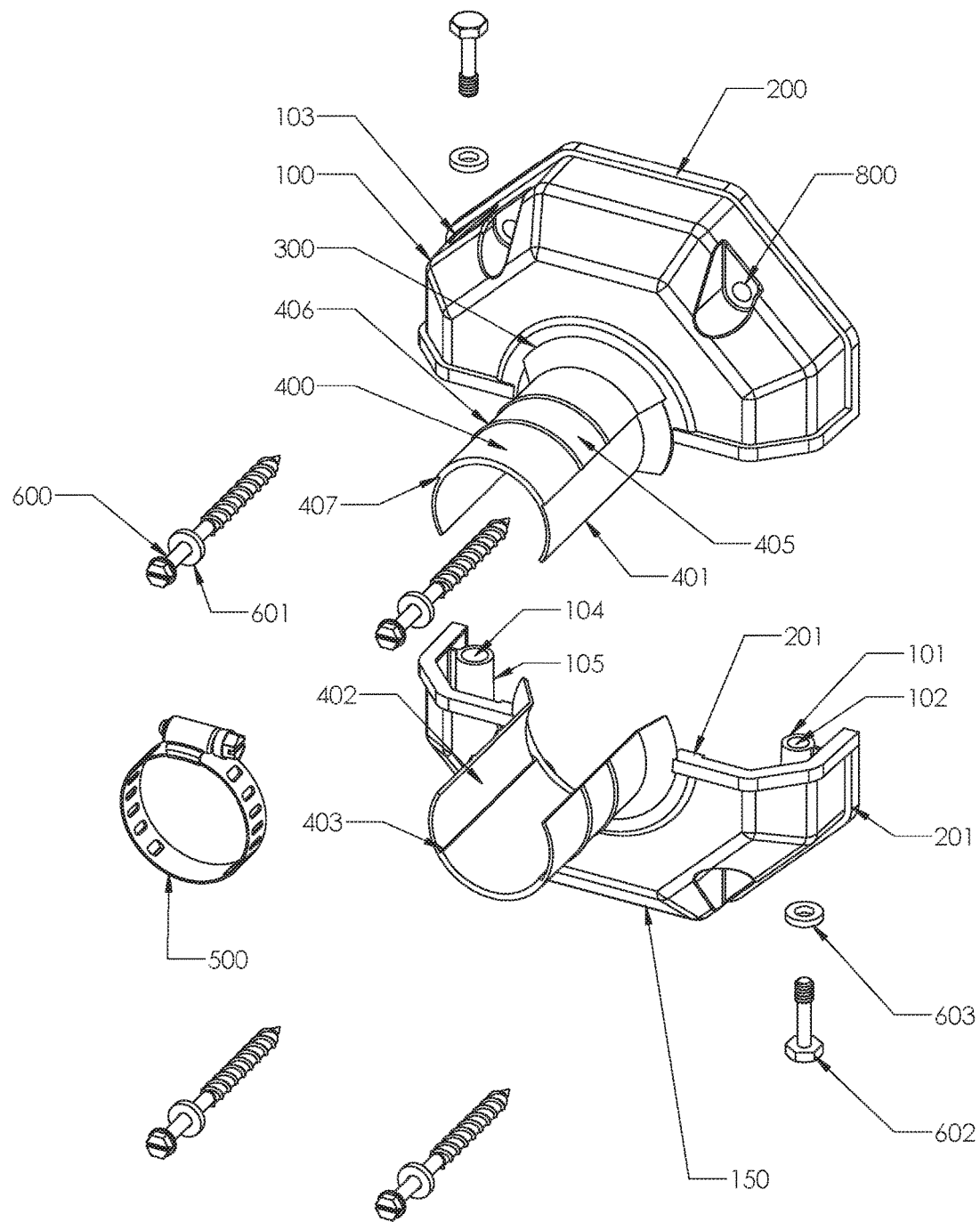
FIG. 8 is a front perspective exploded view of one preferred embodiment of the invention, which is a 2-piece section wall receiver, including the installation hardware.

The two piece embodiment shown in FIG. 8 can have the following features:
400—Elastomeric flexible material inlet port
   401—Elastomeric flexible material inlet port with reduced wall sections to receive (402)
   402—Elastomeric flexible material inlet port with oversized wall sections to fit over (401)
   403—Elastomeric flexible material inlet port joint structure (joins with 407)
   407—Elastomeric flexible material inlet port joint structure (joins with 403)
100—This Body does not have Guiding Pins (Male and Female) to connect the section receivers
   101—Fastener Structure
   102—Fastener Guide
   104—Retaining fastener structure
   105—Retaining element Structure As required, detailed embodiments of the present invention are disclosed; however, it is to be understood that the disclosed embodiments are merely exemplary of the invention, which can be embodied in various forms. Specific structural and functional details disclosed are not to be interpreted as limiting, but merely as a basis for the claims and as a representative basis for teaching one skilled in the art to variously employ the present invention in virtually any appropriately detailed structure. Further, the title, headings, terms and phrases used are not intended to limit the subject matter or scope; but rather, to provide an understandable description of the invention.

The invention is composed of several sub-parts that serve a portion of the total functionality of the invention independently and contribute to system level functionality when combined with other parts of the invention. The term "a" or "an" is defined as "one" or "more than one." The term plurality, as used herein, is defined as "two" or "more than two." The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, P6.

Incorporation by Reference: all publications, patents, and patent applications mentioned in this specification are incorporated by reference to the same extent as if each individual publication, patent, or patent application was specifically and individually indicated to be incorporated by reference.

We claim:

1. A receiver adapted for mounting on a building to receive a pipe, conduit or wiring, said receiver comprising:
   a receiver housing provided with a front panel;
      the receiver housing attached to an exterior of the building with threaded screws or bolts;
      the receiver housing having multiple apertures with integrated sockets for guiding the threaded screws or bolts;
   the receiver housing having a first receiver housing section and a second receiver housing section;
      the first and the second receiver housing sections being removably connected; the receiving housing having at least one inlet entry opening;
      the at least one inlet entry opening having an inlet port, which projects outwardly from the front panel;
      each said inlet port having an opening for receiving the pipe, conduit or wiring;
      each said inlet port has an inlet port flange for engaging the front panel of the receiver housing; and
   a port fastener, which clamps each said inlet port to the pipe, conduit or wiring.

2. The receiver of claim 1, wherein the first and the second receiver housing sections are removably connected with a male connector piece and a female connector piece.

3. The receiver of claim 1, wherein each said inlet port has at least one inlet port guide, which are spaced apart to receive the port fastener.

4. The receiver of claim 1, further comprises a gasket or a seal to engage the receiver housing against the exterior of the building.

5. The receiver of claim 1, wherein the receiver housing is attached to the exterior of the building with at least one of (a) anchoring fasteners or threaded rods and (b) the threaded screws or the bolts; and the port fastener is a clamp, ring or threaded securing fastener.

6. The receiver of claim 1, further comprises an insulated pipe cover for insulation around the pipe, conduit or wiring.

7. A receiver adapted for mounting on a building to receive a pipe, conduit or wiring, said receiver comprising:
a receiver housing provided with a front panel;
the receiver housing attached to an exterior of the building with threaded screws or bolts; the receiver housing having multiple apertures with integrated sockets for guiding the threaded screws or bolts;
the receiver housing having a first receiver housing section and a second receiver housing section; the first and the second receiver housing sections being removably connected together;
at least one inlet entry opening through the front panel of the receiver housing;
the at least one inlet entry opening having an inlet port, which projects outwardly from the front panel;
each said inlet port having an opening for receiving the pipe, conduit or wiring;
each said inlet port being flexible;
each said inlet port has an inlet port flange for engaging the front panel of the receiver housing; and
an elastomeric edge seal engages the receiver housing against the exterior of the building.

8. The receiver of claim 7, wherein the first and the second receiver housing sections being removably connected with a male connector piece and a female connector piece.

9. The receiver of claim 7, further comprises an insulated pipe cover for insulation around the pipe, conduit or wiring, a pipe insulation protector or a vapor retarder.

10. The receiver of claim 7, wherein a port fastener clamps each said inlet port to the pipe, conduit or wiring.

11. A receiver adapted for mounting on a building to receive a pipe, conduit or wiring, said receiver comprising:
a receiver housing provided with a front panel;
the receiver housing attached to an exterior of the building with threaded connectors;
the receiver housing having multiple apertures with integrated sockets for guiding the threaded connectors;
the receiver housing having a first receiver housing section and a second receiver housing section;
the first and the second receiver housing sections being removably connected together with a male connector piece and a female connector piece;
at least one inlet entry opening through the front panel of the receiver housing;
the at least one inlet entry opening having an inlet port, which projects outwardly from the front panel;
each said inlet port having an opening for receiving the pipe, conduit or wiring;
each said inlet port being flexible;
each said inlet port has an inlet port flange for engaging the front panel of the receiver housing.

12. The receiver of claim 11, wherein an elastomeric edge seal engages the receiver housing against the exterior of the building.

13. The receiver of claim 11, wherein a port fastener clamps each said inlet port to the pipe, conduit or wiring.

* * * * *